Figure 1:
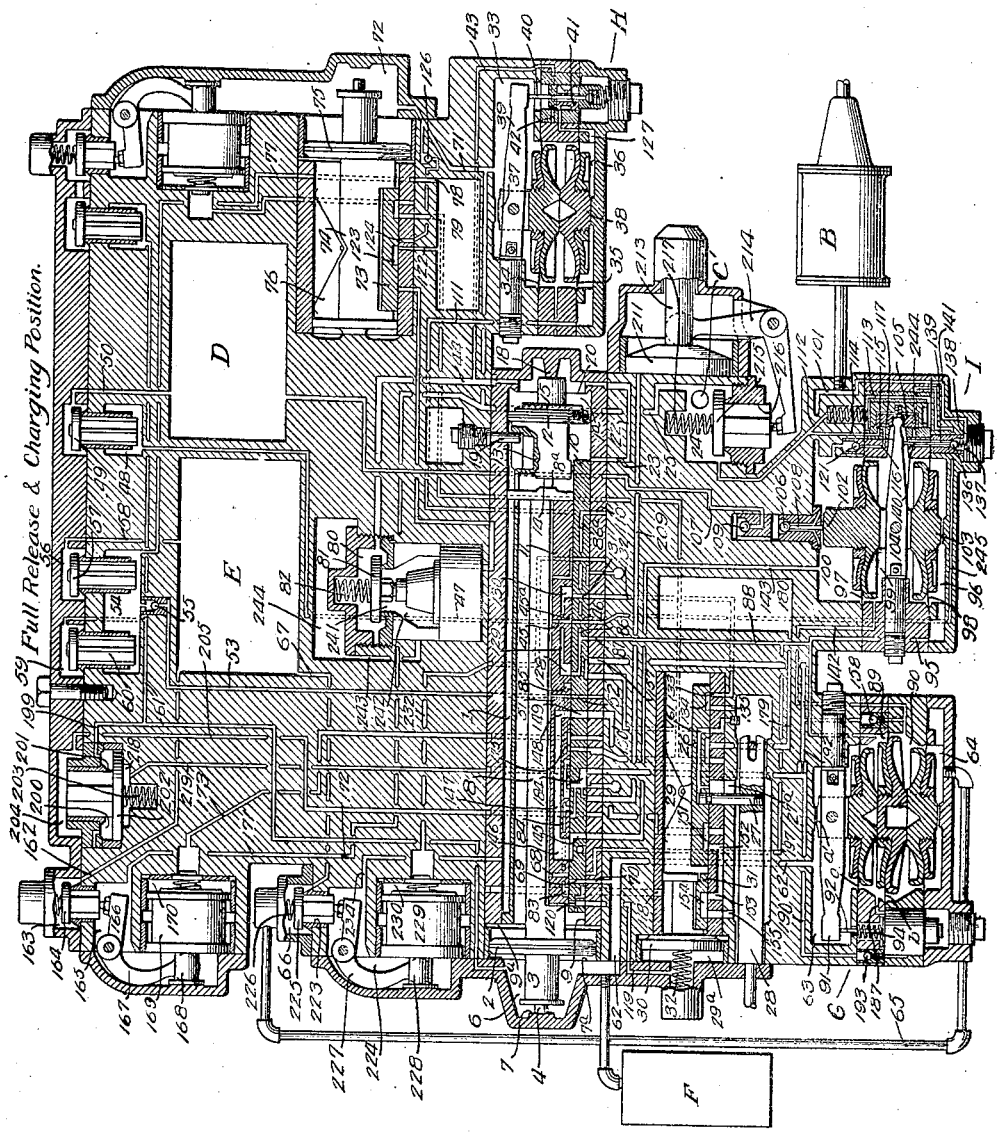

Sept. 28, 1926.

W. ASTLE 1,601,591

CONTROL VALVE FOR AIR BRAKE APPARATUS

Filed May 3, 1926 7 Sheets-Sheet 1

INVENTOR
William Astle.
BY
ATTORNEYS

Sept. 28, 1926.  
W. ASTLE  
1,601,591  
CONTROL VALVE FOR AIR BRAKE APPARATUS  
Filed May 3, 1926  
7 Sheets-Sheet 2
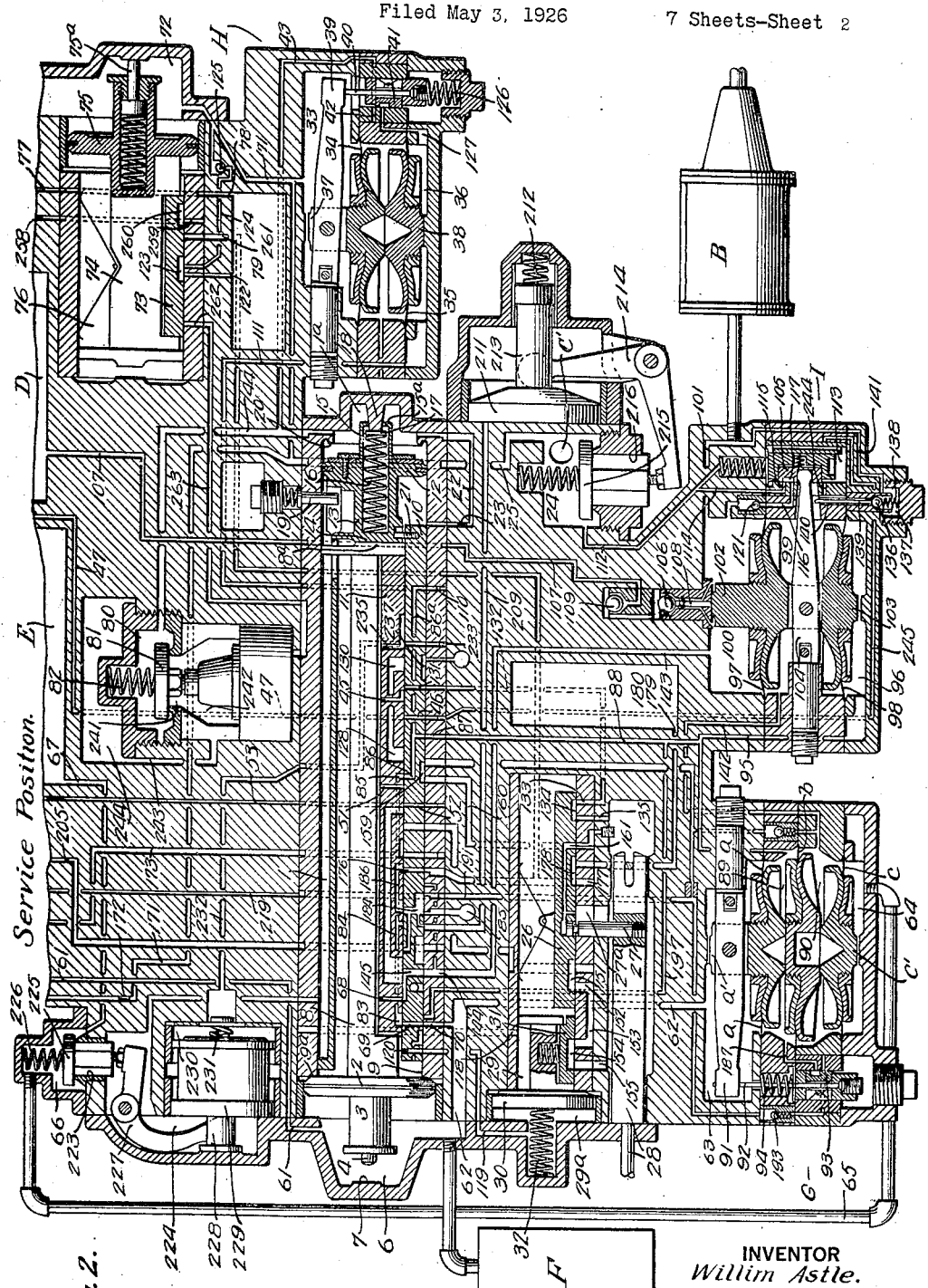
Fig. 2.
INVENTOR  
Willim Astle.  
BY  
ATTORNEYS Sept. 28, 1926.
W. ASTLE
1,601,591
CONTROL VALVE FOR AIR BRAKE APPARATUS
Filed May 3, 1926
7 Sheets-Sheet 5

INVENTOR
William Astle
BY
ATTORNEYS

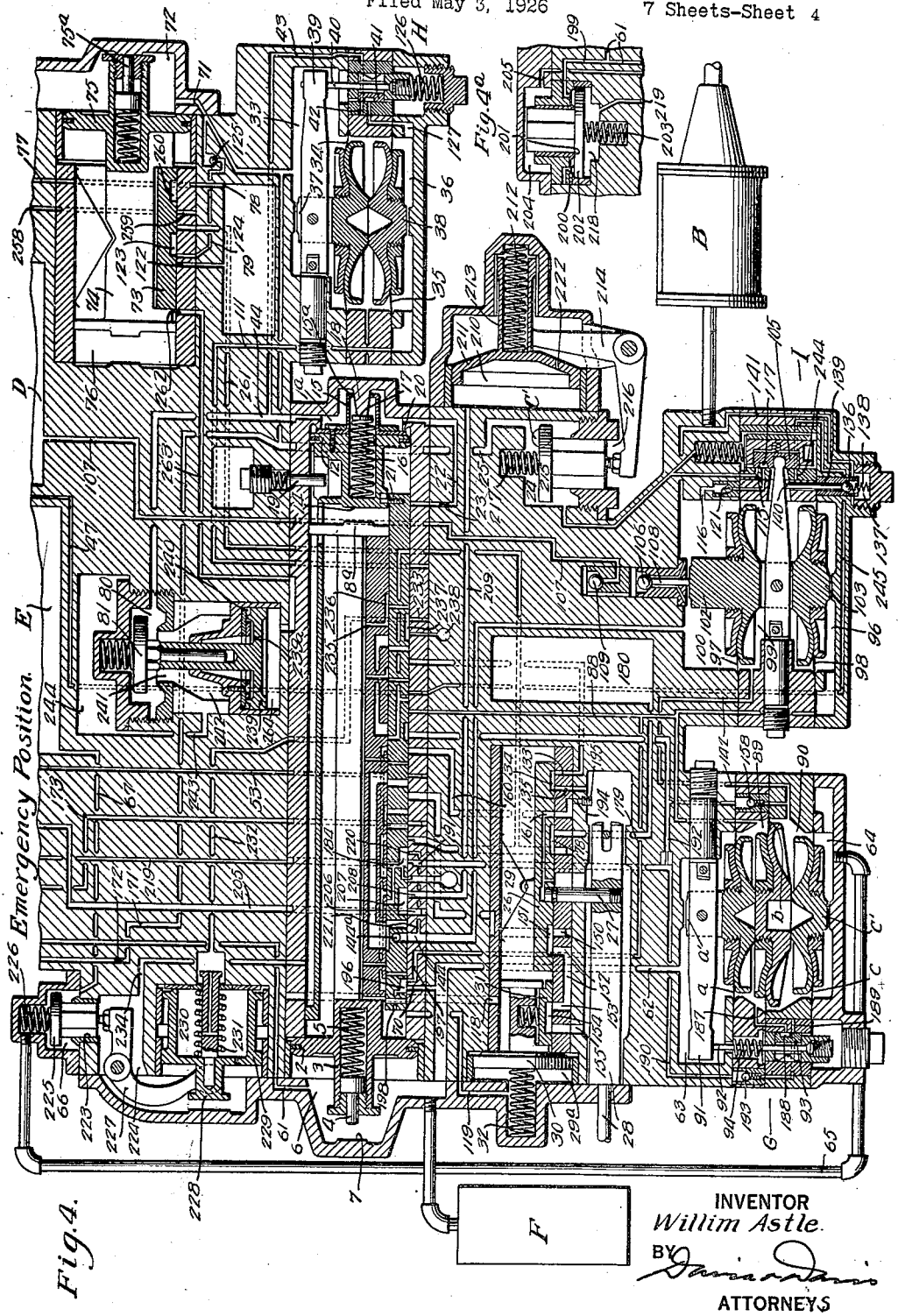

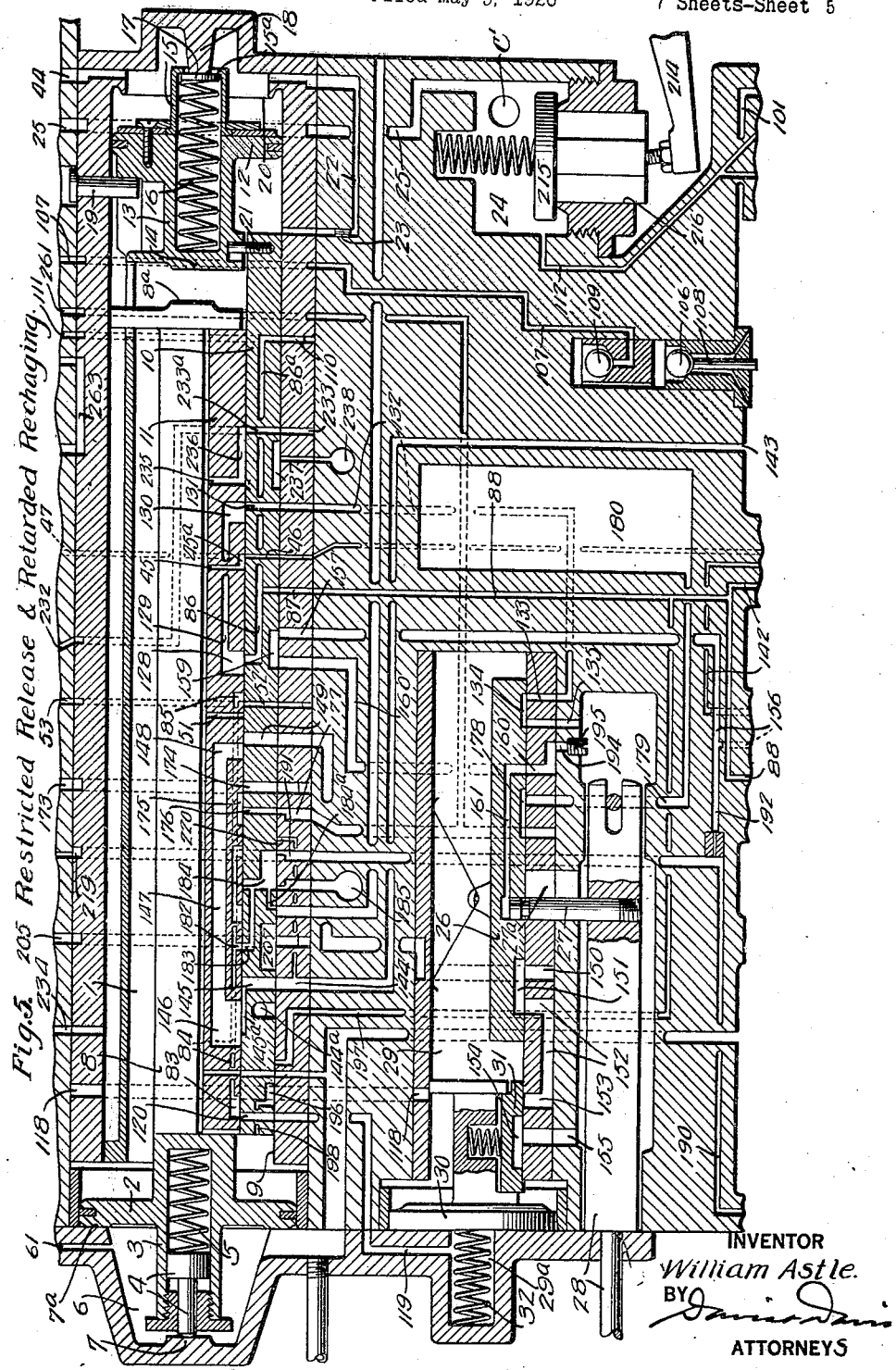

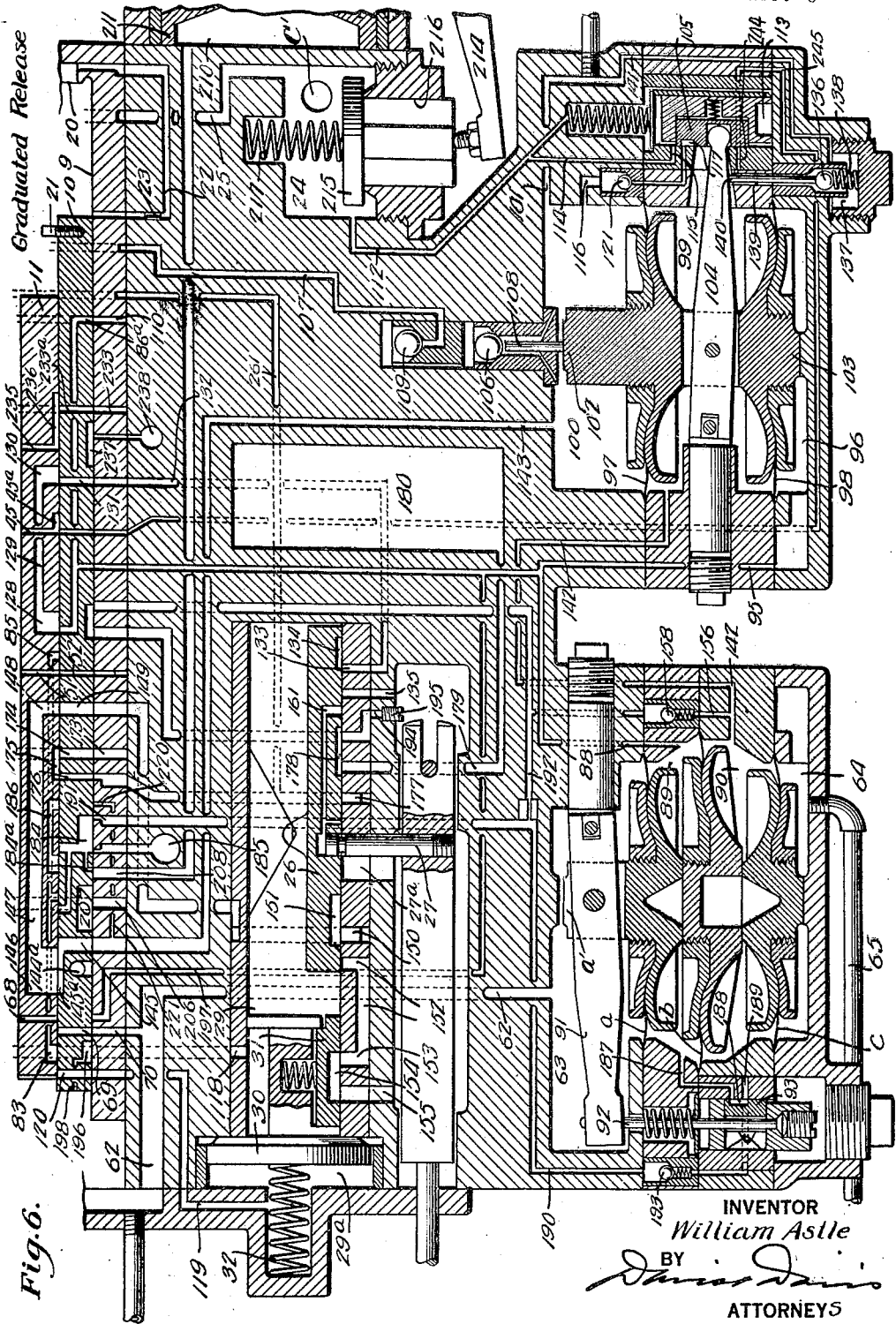

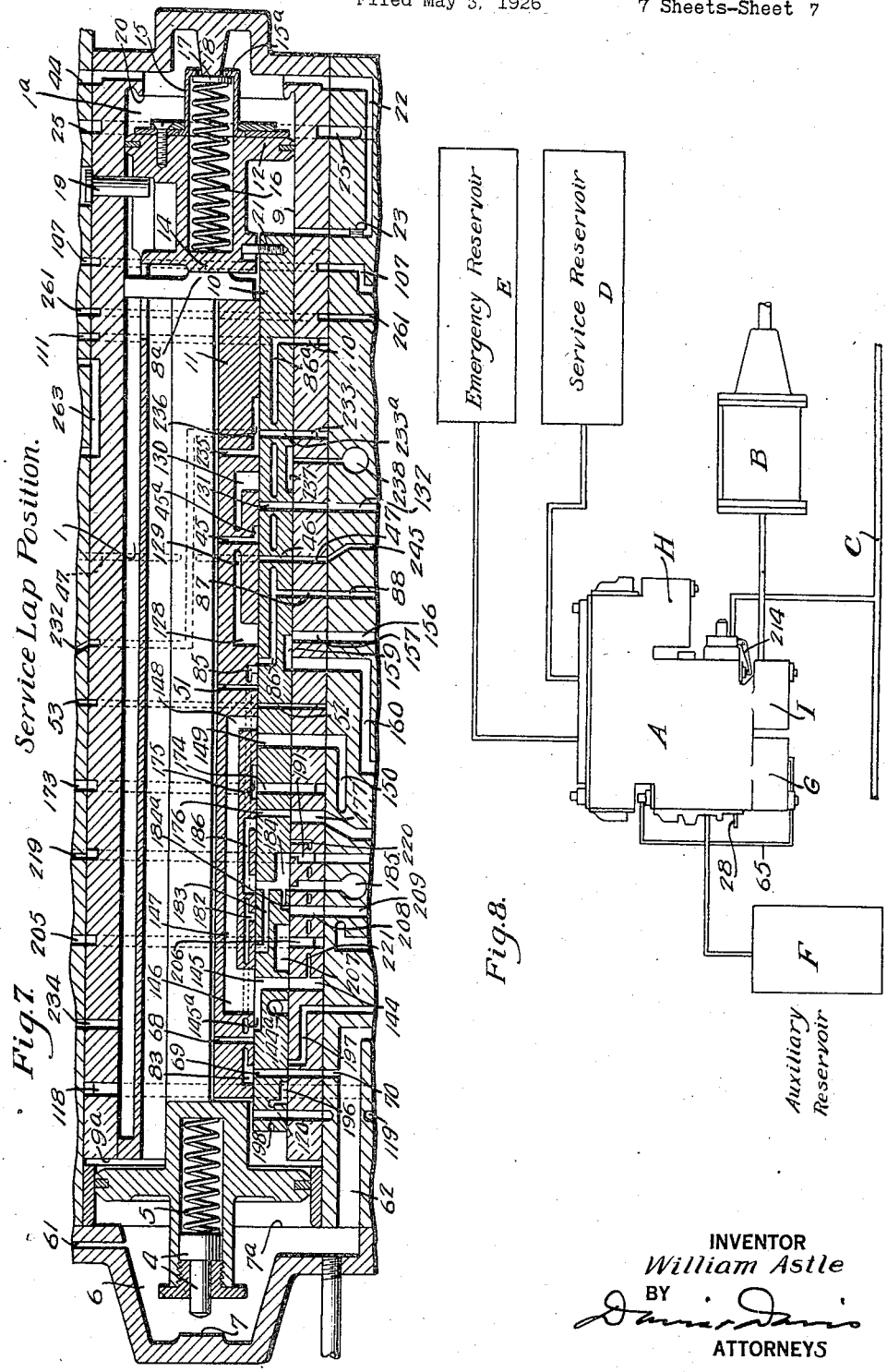

Patented Sept. 28, 1926.

1,601,591

UNITED STATES PATENT OFFICE.

WILLIAM ASTLE, OF BROOKLYN, NEW YORK, ASSIGNOR TO AUTOMATIC STRAIGHT AIR BRAKE COMPANY, OF WILMINGTON, DELAWARE, A CORPORATION OF DELAWARE.

CONTROL VALVE FOR AIR-BRAKE APPARATUS.

Application filed May 3, 1926. Serial No. 106,351.

This invention relates to a control valve for an air brake apparatus in which a service reservoir supplies air for service applications of the brakes and an emergency reservoir supplies air for emergency applications of the brakes, an auxiliary reservoir being provided to supply air pressure for moving the operative parts of the control valve in service and in emergency applications of the brakes, said auxiliary reservoir also being connected to the brake cylinder in emergency applications of the brakes. The control valve is provided with a brake cylinder pressure graduating pilot valve; with a service application valve by means of which the brake cylinder pressure may be built up at a predetermined ratio to the reduction of brake pipe pressure; and with an auxiliary reservoir pressure equalizing valve.

The main objects of the invention are:

1st: To provide a control valve which, in service application position, will connect a service reservoir to the brake cylinder;

2nd: To provide a control valve which, in emergency position, will connect an emergency reservoir and an auxiliary reservoir to the brake cylinder, the service reservoir being sealed;

3rd: To provide a control valve wherein the main slide valve in emergency position will permit auxiliary reservoir air to open a brake pipe vent valve, the main slide valve in emergency position also operating to open an emergency valve to permit emergency reservoir air to flow to the main slide valve chamber and thence to the brake cylinder for an emergency application of the brakes;

4th: To provide a control valve having an auxiliary reservoir pressure equalizing valve which when the brake pipe pressure and the auxiliary reservoir pressure equalizes the auxiliary reservoir, the main slide valve chamber, the brake cylinder chamber of the equalizing valve, the control chamber of the application valve and the brake cylinder pressure chamber of the graduated release valve will all be connected together and the pressures therein equalized and maintained therein cut off from the brake pipe, whereby the brake pipe pressure may be reduced below the said point of equalization without reducing the brake cylinder pressure. The brake cylinder pressure will be maintained at the degree of equalization;

5th: To provide a control valve operating upon an increase of brake pipe pressure to connect the auxiliary reservoir and the main valve chamber to the brake pipe whereby pressure in the auxiliary reservoir above the brake pipe pressure will be discharged back into the brake pipe. This feature of the invention is adapted to operate when the brake pipe pressure has been reduced below the auxiliary reservoir pressure at which time the auxiliary reservoir has been sealed and cut off from the brake pipe;

6th: To provide a control valve with a graduated-release pilot valve by means of which the brake cylinder pressure may be graduated off in response to increases in brake pipe pressure;

7th: To provide a control valve for air brake apparatus with an application valve having a control chamber and a brake cylinder chamber, the pressure in the control chamber opening the application valve to permit air to flow to the brake cylinder pressure chamber and to the brake cylinder, the pressure in said brake cylinder pressure chamber controlling the closure of the application valve;

8th: To provide a control valve with a quick-release valve co-operating with a manually adjustable release-governing valve whereby a portion of the emergency reservoir air will be discharged into the brake pipe when the control valve is in release position;

9th: To provide a control valve with means for retarding the recharging of reservoirs and restricting the release of brake cylinder pressure when there is an excessive brake pipe pressure.

There are other important objects and advantages of the invention, all of which will appear hereinafter.

Figure 3:
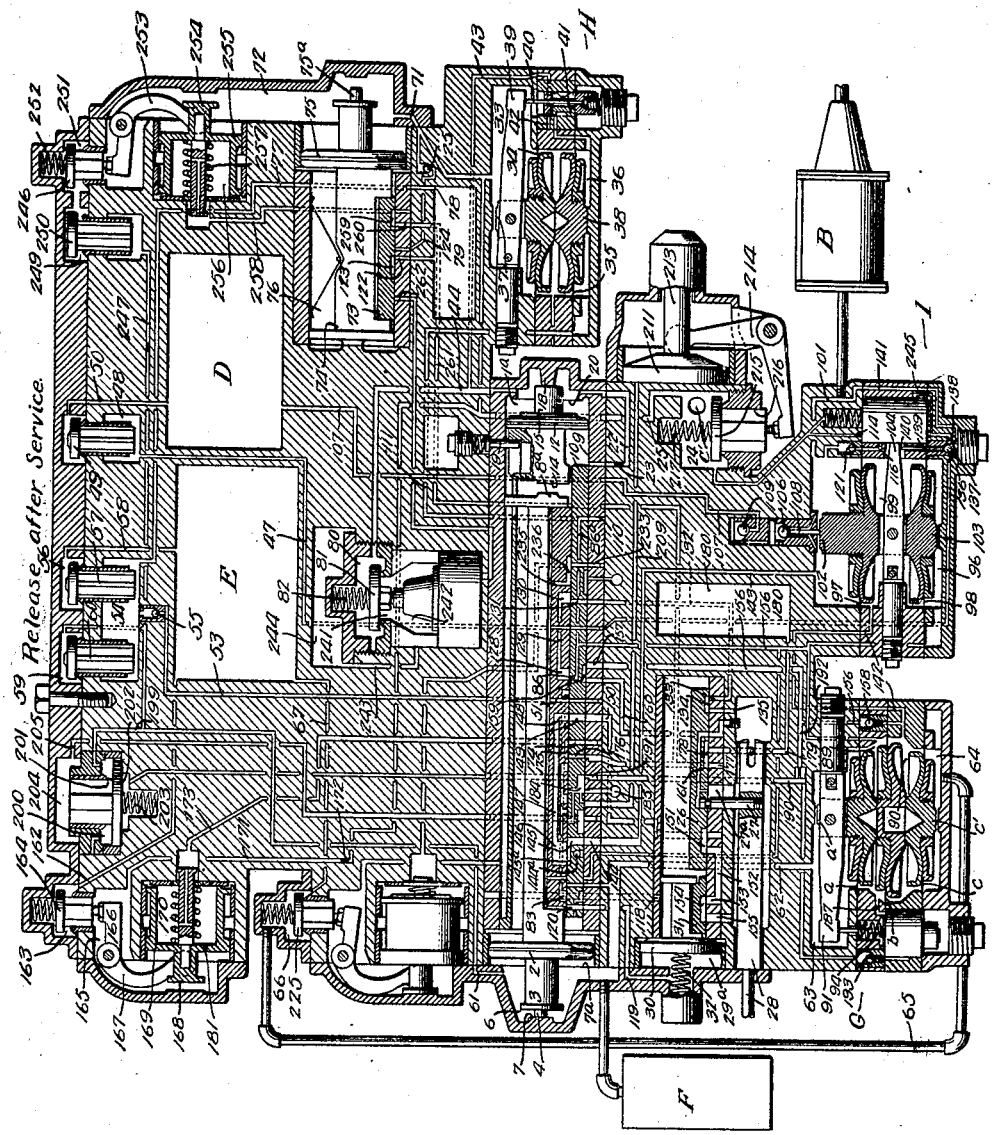

In the drawings, Figure 1 is a diagrammatic sectional view showing the parts of the control valve in release and charging positions;

Fig. 2 a partial diagrammatic sectional view showing the parts of the control valve in service application position;

Fig. 3 a view similar to Fig. 1, showing the parts in release position after a service application;

Fig. 4 a diagrammatic view similar to Fig. 2, showing the parts of the control valve in emergency position;

Fig. 4ª a detail sectional view of the valve which controls the opening of the brake pipe vent valve in emergency operations;

Fig. 5 a sectional diagrammatic view of a portion of the control valve, showing the parts in retarded recharging and restricted release position;

Fig. 6 a diagrammatic sectional view of a portion of the control valve showing the release-governing valve in graduated-release position;

Fig. 7 a diagrammatic sectional view of a portion of the control valve showing the main and supplemental slide valves in service lap position; and Fig. 8 a diagrammatic view of the control valve, its associated reservoirs and the brake pipe and brake cylinder.

In order to simplify the description of the control valve and its operations, the various parts and the ports and passages will not be specifically described except in connection with the description of the various operations of the valve.

In the diagrammatic view Fig. 8, A designates the control valve; B the brake cylinder; C the brake pipe; D the service reservoir; E the emergency reservoir; and F the auxiliary reservoir.

In the control valve is formed a main valve chamber 1. In this chamber is arranged a main actuating service piston 2. The piston 2 separates the main valve chamber 1 from an auxiliary reservoir chamber 6 to which the auxiliary reservoir F is directly connected. The brake pipe is connected to the main valve chamber so that brake pipe pressure is on the inner side of the piston 2 and the auxiliary reservoir pressure is on the outer side of said piston. The piston 2 is formed with an outwardly extending tubular extension 3 in which is arranged a spring 5. Arranged in the tubular extension and directly engaging the spring 5 is a normal charging stop 4. The outer end of this spring-pressed stop is adapted to engage a rigid stop 7 to hold the piston 2 and the connected valves in normal charging position. The stop 4 will yield under an excessive brake pipe pressure in chamber 1 and permit the piston and the connected valves to move outwardly to retarded-charging position. The stop 4 is arranged to normally hold the piston 2 slightly inwardly from a stop wall 7ª so that an excessive brake pipe pressure will force the piston 2 outwardly against the tension of the spring 5 until said piston abuts against the rigid stop wall 7ª of the valve casing. This slight excess movement of the piston under an excessive pressure in chamber 1 is for the purpose of cutting off the charging port leading to the emergency reservoir and opening a small port which leads to the auxiliary reservoir. The charging port leading to the service reservoir remains open in both the normal charging position and in the restricted-charging position of the main and supplemental valves connected to the piston 2. This operation will be more fully hereinafter described.

The piston 2 is formed with an inwardly extending valve-engaging portion 8, said inwardly extending portion also serving as a guide for the piston and for the valve connected thereto. On the main valve seat 9 is arranged a main slide valve 10, and on top of said valve 10 is arranged a supplemental slide valve 11, this latter valve being connected to the piston 2 by the inwardly extending part 8. The valve 11 moves with the piston 2 and slides on top of the main valve 10. The inward movement of the piston 2 to service application position is positively limited by the said piston contacting with the abutment 9ª, said abutment being the end of the valve seat.

In the opposite end of the main valve chamber 1 from the piston 2 is arranged a small emergency piston 12, said piston also serving as a service lap stop to arrest the supplemental slide valve in service lap position. The piston 12 is formed with an inwardly extending, central, tubular part 13 having an inner stop wall 14 which is adapted to serve as a service stop or abutment for the supplemental valve 11. The inner guide portion 8ª of the extension 8 is adapted to engage the stop wall 14. Secured to the outer face of the piston 12 is an outwardly extending tubular extension 15 which is formed with an inwardly extending flange 15ª on its outer end. Within the tubular part 13 and the tubular extension 15 is arranged a service lap stop spring 16, said spring holding a washer 17 against the flange 15ª. Formed on the valve casing in axial alinement with the spring 16 is an abutment 18 which extends into the tubular part 15 and contacts with the washer 17. The spring 16 serves as a means to hold the emergency piston 12 in its inner position, a stop 19 being arranged to hold the emergency piston in its correct normal position and also serving to hold the main slide valve in its normal service and release position. The emergency piston 12 serves to separate the supplemental brake pipe chamber 1ª from the main slide valve chamber 1, and said piston carries on its outer face a gasket which, in the emergency position of the piston 12, engages an annular rib 20 and seals the supplemental brake pipe chamber. The extension 13 of the piston 12 is connected by a pin 21 to the main slide valve. The pin 21 is rigidly connected to the main slide valve and extends up into a slot in the extension 13 so that the piston 12 may have a slight outward movement,—that is to say toward the right hand as viewed in the drawings,—without moving the main slide valve. The slot forms a lost-motion connection between the piston 12 and the main slide valve. The main slide valve remains in its normal position during all operations of the supplemental valve and only moves to emergency position as will be hereinafter described. The main valve chamber is connected to the supplemental brake pipe chamber 1ª by a passage 22 in which is arranged a restriction plug 23. The purpose of this plug is to limit the restriction of brake pipe pressure in chamber 1 to a service rate. The brake pipe is connected at C' to a brake pipe chamber 24 and said chamber is connected to the supplemental brake pipe chamber 1ª, as will be hereinafter described, so that air will flow from the chamber 24 into the chamber 1ª and thence through passage 22 into the main valve chamber. The control valve is provided with a manually operable release-governing valve which consists of a slide valve 26 connected by a stem 27 to an operating rod 28. The stem 27 extends through an operating slot 27ª. To place the valve 26 in quick-release position the operating rod is pulled out, as shown in Fig. 1; and to place it in graduated-release position the said rod is shoved inwardly as shown in Fig. 6. The valve 26 is arranged in a valve chamber 29 and the outer end of this valve chamber, that is to say the left-hand end as viewed in the drawings, is closed by an exhaust-rate-regulating piston 30. Connected to this piston is an exhaust-rate-regulating valve 31. A spring 32 bears on the outer side of the piston 30 and holds the valve 31 in its normal release position. The release-governing valve chamber 29 is connected directly to the main valve chamber 1 by passage 118, so that brake pipe pressure will be always registered in said chamber 29. Chamber 29ª at the outer side of the piston 30 is normally connected to the main brake pipe chamber through passage 119 and port 120 of the main slide valve, so that brake pipe pressure is normally in said chamber 29ª. When there is an excessive brake pipe pressure in the main valve chamber 1 chamber 29ª will be vented to atmosphere and the valve 31 will be moved into retarded-release position by the pressure in chamber 29, all of which will be more fully hereinafter described.

*Release and charging.*

In charging the system brake pipe air flows through the brake pipe connection C' into the brake pipe chamber 24 and through passage 25 into the brake pipe chamber 33 of the auxiliary reservoir pressure equalizing valve mechanism H.

The auxiliary reservoir pressure-equalizing valve mechanism H comprises a pair of parallel diaphragms 34 and 35 which are suitably spaced apart and secured around their marginal edges in a suitable valve casing. Between the two diaphragms is formed a chamber which is open to atmosphere. An equalizing control chamber 36 is formed between the diaphragm 35 and the lower wall of the valve casing. Between the upper diaphragm 34 and the upper wall of the valve casing is formed the brake pipe chamber 33. The diaphragm 34 carries a central upwardly extending stop stem 37 which is adapted to engage the upper wall of the chamber 33 to limit the upward movement of the diaphragms. The lower diaphragm 35 carries a central depending stop 38 which is adapted to engage the lower wall of the valve casing to limit the downward movement of the diaphragm. In the chamber 33 is arranged a lever 39, said lever being pivoted at one end to the valve casing and connected at its other end to a valve rod 40. Said lever is pivotally connected to the stop stem 37 so that the outer free end of said lever will move up and down in response to the movements of the diaphragms. Connected to the valve rod 40 is an equalizing valve 41, the operation of which will be more fully hereinafter described.

The brake pipe air flowing into chamber 33 will depress the diaphragm structure and move the equalizing valve 41 to its lower position uncovering a port 42 which opens directly into the chamber of the equalizing valve, this chamber being in direct and open communication with the brake pipe chamber 33. Port 42 is connected to a passage 43 which connects with a passage 44 leading directly into the supplemental brake pipe chamber 1ª. Brake pipe pressure will, therefore, flow from chamber 33 through port 42, passages 43 and 44 into the chamber 1ª and thence through passage 22 into the main slide valve chamber 1 and the piston 2 will be moved toward the left hand as viewed in the drawings until the normal charging stop 4 engages the abutment 7. This movement of the piston 2 will place the supplemental valve 11 in normal charging position. The emergency piston will be held against its stop 19 and the main slide valve will be held in its normal position. From the main valve chamber 1 brake pipe air will flow through port 45 in the supplemental slide valve, port 46 in the main slide valve, port and passage 47 to chamber 48. From chamber 48 air will flow past check valve 49 into passage 50 and thence direct into the service reservoir D. The check valve 49 will prevent service reservoir air passing back from the service reservoir to the chamber 48.

From the main valve chamber 1 brake pipe air will pass through port 51 in the supplemental slide valve 11, port 52 in the main slide valve into port and passage 53. Passage 53 leads into chamber 54, a back pressure check valve 55 being arranged in said passage 53 to prevent the flow of air from chamber 54 back through the passage 53. Connected to chamber 54 is a small chamber 56, a back pressure check valve 57 being arranged between said chambers and permitting air to flow from chamber 54 into chamber 56. Chamber 56 is connected by passage 58 to the emergency reservoir E. Connected to the chamber 54 is a small chamber 59, a back pressure check valve 60 being arranged between said chambers so that air may pass from chamber 54 into the chamber 59. Chamber 59 is connected by a passage 61 to the auxiliary reservoir chamber 6. The auxiliary reservoir is directly connected to said chamber 6 so that said reservoir and said chamber 6 will be charged with air from chamber 54 past check valve 60, chamber 59 and thence through the passage 61.

The main valve chamber 1 is directly connected to the release governing valve chamber 29 by passage 118 so that said chamber 29 will be charged from the main valve chamber. Chamber 29ª is charged from the main valve chamber through port 120 and passage 119. A passage 62 connects the auxiliary reservoir chamber 6 to the actuating chamber 63 of the graduated release valve mechanism G so that the said chamber 63 will be charged from the auxiliary reservoir. The emergency reservoir chamber 64 of the graduated release valve mechanism is connected by pipe 65 to a small chamber 66 and said chamber is connected by passage 67 to the emergency reservoir E, so that chamber 64 will be charged with emergency reservoir air.

The brake pipe passage 25 is connected by a passage 71 to the brake pipe chamber 72 of an auxiliary emergency valve 73. The valve 73 is connected to the stem 74 of a piston 75. The piston 75 operates in chamber 72 and separates said chamber from the auxiliary emergency valve chamber 76. The chamber 76 is connected by a passage 77 to chamber 54 so that the valve chamber 76 will be charged with brake pipe pressure from the chamber 54. The brake pipe pressure flowing into chamber 72 will force the piston 75 inwardly to the left-hand end of the chamber 72. The pressures on opposite sides of the piston will be equal when the system is fully charged. Passage 77 is connected by passage 78 to a small chamber 79 so that said chamber will be charged with brake pipe pressure.

Passage 44 leads from the supplemental brake pipe chamber 1ª to a chamber 80 above a supplemental emergency vent valve 81, said valve being normally held to its seat by a spring 82 and the brake pipe pressure in chamber 80.

With an excessive brake pipe pressure in chamber 1 the piston 2 will be forced to the left, compressing the normal charging spring 5 until the piston 2 engages the rigid stop wall 7ª. This will cause a movement of the supplemental slide valve toward the left and move the charging port 51 out of register with the port 52 and thereby interrupt the flow of air to the emergency reservoir and to the auxiliary reservoir through port and passage 53. The port 45 is provided with an extension 45ª so that it will remain in communication with port 46 when the port 51 is out of register with port 52 as just described. This will permit brake pipe air to flow to the service reservoir during the period of excessive pressure in the main valve chamber 1. The excess movement of the supplemental slide valve toward the left, just described, will bring a restricted port 68 in the supplemental slide valve into register with a port 69 of the main slide valve, and said port 69 is in register with a port 70 in the main slide valve seat. Port 70 leads into the large passage 62 which is in direct communication with chamber 6 and the auxiliary reservoir, so that in the retarded charging position of the supplemental slide valve the auxiliary reservoir and the service reservoir will be charged but the emergency reservoir will be cut off from the main valve chamber and will not be charged during the period of excesssive pressure in the main valve chamber. The restricted port 68 will retard the charging of the auxiliary reservoir.

Service application.

A service application of the brakes is brought about by a service reduction of brake pipe pressure in the usual manner. A service reduction of brake pipe pressure in chamber 24 will result in a corresponding reduction of pressure in the brake pipe chamber 33 of the equalizing valve mechanism and this in turn will result in a corresponding reduction of pressures in the main valve chamber 1 and in the supplemental brake pipe chamber 1ª. Air will flow from the main valve chamber through the passage 22 into the chamber 1ᵃ and from said chamber through passages 44, 43 and port 42 into the chamber 33. The restriction plug 23 will limit the reduction of pressure in chamber 1 to a service rate. The restriction plug 23 is to prevent an immediate emergency reduction of pressure in the main valve chamber when there is an emergency reduction of brake pipe pressure. A service reduction of brake pipe pressure in chamber 1 will result in a movement of the piston 2 inwardly or toward the right as viewed in the drawings, because of the auxiliary reservoir pressure on the upper or left hand face of the piston 2. The piston 2, and the supplemental slide valve 11 connected thereto, will move inwardly until the guide 8ᵃ engages the abutment 14 of the piston 12. The abutment 14, the piston 12 and the piston 2 will continue to move against the tension of the spring 16 until the lost motion between the abutment 14 and the pin 21 is taken up, at which time the piston 2 will have engaged the fixed abutment stop 9ᵃ. The supplemental slide valve will then be in service application position as shown in Fig. 2. When the supplemental slide valve is in service position port 69 of the main slide valve registers with port 83 of the supplemental slide valve. Port 83 is connected by a long passage 84 in the supplemental slide valve to a port 85 in the face of said valve. This port 85 is in register with a port 86 in the main slide valve and this latter port is in register with a port 87 in the main slide valve seat. Port 87 is connected to a passage 88 which leads into the equalizing chamber 89 of the graduated release valve structure.

The graduated release valve structure comprises an actuating diaphragm $a$; an equalizing diaphragm $b$; and an emergency diaphragm $c$. These diaphragms are suitably mounted in a casing and are parallel with each other to form a series of air chambers. The diaphragm $b$ is larger in area than the actuating diaphragm, for a purpose which will hereinafter appear. Between the diaphragm $a$ and the upper wall of the valve casing is formed the actuating chamber 63. The equalizing chamber 89 is between the actuating diaphragm $a$ and the equalizing diaphragm $b$. Between the diaphragms $b$ and $c$ is formed a retention chamber 90. The function of this chamber will be fully hereinafter described. Between the emergency diaphragms $c$ and the lower wall of the valve casing is formed the emergency reservoir chamber 64. The central supports of the diaphragms are in close engagement with each other so that the diaphragms move up and down together, or substantially so, in accordance with the variations in the controlling pressures in the chambers of the diaphragm structure. The emergency diaphragm $c$ carries a downwardly extending release stop $c'$ and the actuating diaphragm $a$ carries an upwardly extending application stop $a'$, said latter stop being arranged at the upper end of a central stem carried by the actuating diaphragm. In the actuating chamber 63 is arranged a lever 91. One end of this lever is pivoted on a post secured to the wall of the actuating chamber and the other end thereof is connected to a valve rod 92. Intermediate its ends the lever 91 is pivotally connected to the upwardly extending stop stem $a'$ so that the lever will be swung up and down by the up-and-down movement of the actuating diaphragm. On the lower end of the valve rod 92 is secured a graduated release valve 93 and said valve is held in its normal lap position by a spring 94.

The lower end of the passage 88 is connected by a passage 95 to the pressure control chamber 96 of an application valve mechanism I. This application valve mechanism comprises a pair of parallel diaphragms 97 and 98 spaced a suitable distance apart to form a brake cylinder release chamber 99 between them. The marginal edges of these diaphragms are suitably secured in the valve casing. The pressure control chamber 96 is formed between the lower diaphragm 98 and the lower wall of the valve casing. Between the upper diaphragm 97 and the upper wall of the valve casing is formed a brake cylinder pressure chamber 100, said chamber being in direct and open communication with the brake cylinder B through passage 101. The central supports of the diaphragms 97 and 98 abut against each other so that the diaphragms move up and down together. The diaphragm 97 carries an upwardly extending central stem 102; and the diaphragm 98 carries a depending central stop 103 which is adapted to engage a fixed stop which limits the downward travel of the diaphragm. Extending horizontally through the release chamber is a lever 104, one end of said lever being pivoted to a rigid post fixed in the wall of the valve casing. The lever 104 passes through a slot in the central stem of the diaphragm structure and is pivotally connected thereto. The outer free end of the lever 104 is connected to a small slide valve 105, said slide valve serving as a compensating valve. An application valve 106 is mounted in a passage 107 leading from the service reservoir D into the brake cylinder pressure chamber 100. The application valve is in the form of a check valve which normally seats toward the chamber 100. A sliding stem 108 is adapted to engage the valve 106, its lower end projecting into the chamber 100 and being adapted to be engaged by the stop stem 102 when the diaphragms are moved upwardly to application position. When the application valve is unseated by the upward movement of the stop stem 102 service reservoir air will flow from the reservoir D through passage 107 past check valve 109 and then past the application valve into the chamber 100 and thence to the brake cylinder. The check valve 109 prevents the passage of air from chamber 100 back to the service reservoir. In the main slide valve is formed a port and passage 86ᵃ as an extension of the port 86. The port 86ᵃ registers with a port 110 in the main slide valve seat and said port is connected by passage 111 to the equalizing control chamber 36 of the equalizing valve mechanism.

When the supplemental slide valve 11 is in service application position, as shown in Fig. 2, auxiliary reservoir air will flow through passage 62, ports 70 and 69, ports and passage 83, 84, 85. From port 85 air will flow through port 86 into passage 88 and thence to chamber 96 of the application valve and to the equalizing chamber 89 of the graduated release valve. From port 86 air will also flow through port and passage 86ᵃ, port and passage 110—111 into the equalizing control chamber 36 of the equalizing valve. Air will continue to flow from the auxiliary reservoir and chamber 6 until the pressure in chamber 6 has been reduced to an equality with the pressure in chamber 1, or substantially so and the spring 16 will then move the supplemental slide valve to service lap position, as shown in Fig. 7, thereby closing communication between ports 85 and 86 and interrupting the flow of air to the three chambers just mentioned. Chambers 89, 96 and 36 are so proportioned that their combined volume has a predetermined ratio to the volume of the auxiliary reservoir. This ratio is preferably such that the pressure built up in these three chambers will be two-and-one-half times the amount of reduction of pressure in chamber 1, that is to say, for a ten pound reduction in chamber 1 there will be a twenty-five pound pressure build up in the said three chambers before the supplemental slide valve is moved to lap position. It is manifest, however, that this ratio of pressure build up may be varied as desired, by varying the volume of the auxiliary reservoir and of the three chambers. The actuating chamber 63 of the pilot valve is connected through passage 62 to the auxiliary reservoir so that the pressure in the actuating chamber will be reduced with the pressure in the auxiliary reservoir and that the diaphragm structure of the graduated release valve will tend to move upwardly. However, air is at the same time flowing into chamber 89, and because of the larger area of the diaphragm $b$ the pressure in said chamber will tend to maintain the diaphragm structure substantially in a balanced condition. Should there be any slight initial movement of the diaphragm structure the valve 93 would make an upward idle movement. When the supplemental slide valve has been moved to lap position the downward force exerted by the pressures in chambers 63 and 89 will balance the upward force of the emergency reservoir pressure in chamber 64.

Air flowing into the control chamber 96 of the application valve will force the diaphragm upwardly thereby unseating the application valve 106. Air will flow from the service reservoir D through passage 107 past check valve 109 and then around the application valve 106 into the chamber 100 and thence to the brake cylinder through passage 101. This flow of air to the brake cylinder is entirely independent of the supplemental valve.

The brake pipe chamber 24 is connected by a passage 112 to the chamber 113 of the compensating valve 105. Passage 112 is connected by passage 114 to a port 115 in the seat of the compensating valve. A port and passage 116 leads from the compensating valve seat into the chamber 100. The compensating valve is formed with a cavity 117. When the diaphragm structure is moved upwardly to open the application valve the compensating valve is moved upwardly and the cavity 117 connects port 115 to port and passage 116 so that brake pipe air will flow from chamber 24 through passages 112 and 114 and thence through passage 116 into the brake cylinder chamber 100.

Air will continue to flow from the service reservoir and the brake pipe into the brake cylinder until the pressure in the chamber 100 is equal to, or slightly exceeds, the pressure in the control chamber 96. The slightly superior pressure in chamber 100 will depress the diaphragms 97 and 98 and permit the application valve 106 to close and move the compensating valve to lap position, thereby interrupting the flow of air to the brake cylinder. In the passage 116 is arranged a check valve 121 to prevent high pressure brake cylinder pressure from flowing back into the brake pipe. Should there be a leak from the brake cylinder and a resulting reduction in pressure in chamber 100, the pressure in the control chamber 96 would move the diaphragms upwardly and place the compensating valve in application position and also open the application valve. The brake cylinder pressure would be again built up, from the service reservoir and the brake pipe, slightly in excess of the pressure in chamber 96, whereupon the application valve would close and the compensating valve would be moved back to lap position.

Brake pipe pressure is always present in chamber 33 of the equalizing valve. As this brake pipe pressure is greatly in excess of the pressure built up in chamber 36 upon a service reduction of brake pipe pressure, there will be no movement of the diaphragms 34 and 35. These diaphragms will be held in their lowermost position and the equalizing valve 41 will be held lapped or closed.

The brake pipe pressure in chamber 72 will be reduced with the pressure in chamber 33 of the equalizing valve and with the brake pipe pressure. A service reduction of pressure in chamber 72 will permit the pressure in chamber 76 to force the piston 75 outwardly, the service stop 75ª arresting the piston in service position, as shown in Fig. 2, and the auxiliary emergency valve 73 will be moved into service position. The chamber 79 will be connected by a passage 122, cavity 123 of the auxiliary emergency valve and passage 124, to the brake pipe passage 71. The chamber 79 is directly connected to the valve chamber 76 through the passage 78 so that in the service position of the valve 73 there will be an equalization of pressures on opposite sides of the piston 75 and this will prevent the auxiliary emergency valve going to emergency position. In the passage 124 is arranged a check valve 125 to prevent air passing from the brake pipe back to the chamber 79.

If it be desired to increase the brake cylinder pressure a further reduction of brake pipe pressure must be made whereupon the operation just described will be repeated so that the brake cylinder pressure may be increased in steps, if desired, up to the point of equalization of brake pipe pressure with auxiliary reservoir pressure.

When the brake pipe pressure and the auxiliary reservoir pressure have been equalized either by repeated service reductions of brake pipe pressure or by a full service reduction thereof, there will be equal pressures in chambers 36 and 33 of the auxiliary reservoir equalizing valve. When this occurs the diaphragms will be balanced and the equalizing valve 41 will be moved upwardly by the spring 126. Spring 126 is normally depressed and under tension because of the superior pressure in chamber 33. When the pressure in chambers 36 and 33 have equalized spring 126 will move the equalizing valve upwardly and connect port 42 with port and passage 127 leading to the chamber 36. This will connect chamber 36 to the supplemental brake pipe chamber 1ª and to the main brake pipe chamber 1. As hereinbefore pointed out the auxiliary reservoir, in the service position of the supplemental valve, is connected to the chamber 36 and to chambers 96 and 89. It is clear, therefore, that the pressures in the main valve chamber 1; the supplemental brake pipe chamber 1ª; the chambers 36, 96 and 89; and the auxiliary reservoir will be equalized. At the same time all of these chambers are cut off from the brake pipe due to the fact that the port 42 is connected by the equalizing valve to the port and passage 127. It is clear, therefore, that if the brake pipe pressure be now further reduced such reduction will have no effect upon the pressures in all of the chambers which are connected together and in which the pressures equalize as just described and the brake cylinder pressure will be unaffected by such further reduction of brake pipe pressure. Brake cylinder leakage will be compensated for from the service reservoir and the check valve 121 will prevent brake cylinder pressure passing back to the brake pipe. The trapped pressure in chamber 96 will move the diaphragm structure upwardly to open the application valve if the brake cylinder pressure leaks down.

When the supplemental slide valve 11 is in service application position the quick release chamber 180 will be vented to atmosphere as hereinafter described.

When the compensating valve 105 is in application position, this also being compensating position, port 244 in the seat of the compensating valve is uncovered. Port 244 is connected to a passage 245 which is connected to port 47 in the seat of the main slide valve. As hereinbefore pointed out passage 47 leads to the chamber 48 and said chamber is in communication with the service reservoir. It is clear, therefore, that when the compensating valve 105 is in application position brake pipe air may flow from the compensating valve chamber 113 into the service reservoir. The check valve 49 will prevent service reservoir air flowing to the compensating valve chamber should the pressure in said reservoir be superior to the brake pipe pressure in said chamber.

*Release after service—Quick release.*

To effect a release of the brakes after a service application the brake pipe pressure must be increased in the usual manner through the manipulation of the engineer's brake valve. The increased brake pipe pressure will flow into chambers 1 and 1ª from the brake pipe chamber 24 precisely as described in the charging operation. The increase of pressure in chamber 1 will force the piston 2 and the supplemental slide valve to normal release and charging position, as shown in Fig. 3. In the release position of the supplemental slide valve port 86 of the main slide valve is connected to port 128 of the supplemental slide valve. Port 128 is connected by a passage 129 to port 130 and this latter port registers with port 131 of the main slide valve. Port 131 is in communication with port and passage 132 which leads to a port 133 in the seat of the release governing valve 26. In the release governing valve is formed a cavity 134, which, in the quick release position of said valve, as shown in Fig. 3, places port 133 in communication with exhaust port 135. Air will therefore exhaust from chambers 36, 96, and 89. The reduction of pressure in chamber 36 will have no effect upon the equalizing valve mechanism because of the superior brake pipe pressure in chamber 33. The reduction of pressure in the control chamber 96 will result in a downward movement of the diaphragms because of the superior pressure in the brake cylinder chamber 100. The lever 104 and the compensating valve 105 will be moved downwardly, but the movement of the compensating valve will be an idle one. A brake cylinder release valve 136 is arranged in a chamber 137, said valve being in the form of a ball check valve held to its seat by a spring 138. The chamber 137 is connected by passage 139 to the release chamber 99, and extending through said passage is a pin 140, the lower end of said pin engaging the valve 136 and the upper end thereof engaging the lever 104. When the lever 104 is depressed, as described, the release valve 136 is opened. Chamber 137 is connected by passage 141 to the brake cylinder passage 101 so that when the valve 136 is unseated brake cylinder pressure will flow into the release chamber 99. The release chamber 99 is connected by passage 142 to the retention chamber 90. The passage 142 is connected to atmosphere, as will be hereinafter described under the heading "Release after service—Graduated release."

The brake cylinder pressure chamber 100 is connected by passage 143 to port 144 in the main slide valve seat. In the main slide valve is formed a port 145 which is in register with the port 144 and is provided at its upper end with a long extension 145ª. This extension is in register with a port 146 of the supplemental slide valve and said port is connected by a passage 147 to a port 148. This latter port is in register with a port 149 of the main slide valve and this port registers with a port and passage 150 which leads to the seat of the release-governing valve. The release-governing valve is formed with a cavity 151, which in the quick release position of said valve connects port 150 with port and passage 152, said passage leading to a port 153 in the seat of the exhaust valve 31. In said valve is formed a cavity 154 which in the normal position of the valve 31 connects port 153 to an atmospheric port 155.

Passage 142 is connected by a passage 156 to a port 157 in the main slide valve seat. In said passage 156 is a check valve 158 which seats downwardly toward the passage 142. This valve is normally held away from its seat by a light spring but will be seated by pressure sufficiently high to overcome said spring. The main slide valve is formed with a cavity 159 which connects port 157 to a port and passage 160 which leads from the main slide valve seat to the seat of the release governing valve. The release governing valve is formed with a port and passage 161 which, in the quick release position of the said valve, connects port 160 to atmosphere. It is clear, therefore, that brake cylinder pressure flowing through passage 142 will also flow up through passage 156, and through the connected passages and ports just described to atmosphere through port 161. The main exhaust, however, will be through the large exhaust 155.

The emergency reservoir E is connected by a passage 162 to a small chamber 163. In said chamber is arranged a quick release valve 164 which is normally seated by a spring and closes communication between chamber 163 and a chamber 165. The quick release valve 164 is adapted to be engaged by an adjustable screw in the substantially horizontal arm 166 of a bell crank lever 167. The downwardly extending arm of this lever is operatively connected to a stem 168 of a quick release plunger 169. This plunger is mounted to reciprocate in a chamber 170 and its outer end is subject to the pressure in chamber 165 and said chamber is connected by a passgae 171 to the brake pipe passage 25 and in this passage is a restriction plug 172 which regulates the flow of air to the brake pipe. In the chamber 170 is arranged a spring which normally holds the plunger 169 in its inner position. Chamber 170 is connected by a passage 173 to a port in the main slide valve seat. The main slide valve is formed with a port 174 which registers with port 173, and the supplemental slide valve is formed with a cavity 175 which connects port 174 to a port 176 of the main slide valve. This latter port registers with a port and passage 177 which leads to a port in the seat of the release governing valve. The release governing valve is formed with a cavity 178 which connects port 177 to a port and passage 179 which leads into the quick release chamber 180. With the release-governing valve in quick release position and the supplemental slide valve in release position chamber 170 will be vented into the quick release chamber 180, through the ports and passages just described. The superior pressure on the outer side of plunger 169 will force said plunger inwardly and open the quick release valve 164. This will permit emergency reservoir air to flow to the brake pipe through passage 171, and this will result in quickly raising brake pipe pressure and bringing about a quick serial release operation. The quick-release plunger is provided with a leak port 181 so that the pressure on opposite sides of said plunger will equalize and permit the spring to force the plunger inwardly, which will result in the closure of the quick-release valve 164. The period of time during which the quick-release valve will remain open will depend upon the size of the quick-release chamber 180 and the size of the leak port 181. By properly proportioning these parts the desired amount of emergency reservoir air may be discharged into the brake pipe. The restriction plug 172 must also be properly proportioned to get the desired result.

If, during the release period, there should be an excessive pressure in chamber 1, the piston 2 and the supplemental slide valve would be carried to restricted-release and retarded-recharging position as shown in Fig. 5. In this position of the supplemental slide valve the port 83 is in register with the port 120 so that pressure in chamber 29ᵃ will be exhausted to atmosphere through port 83, passage 84, and supplemental exhaust port 182 of the supplemental slide valve. This port 182 is in register with a port 183 of the main slide valve and said latter port opens into a large port and cavity 184 in said valve, and said cavity is in register with an atmospheric port 185. The pressure in the release-governing valve chamber 29 will force the piston 30 and the valve 31 outwardly to the limit of its movement and this movement of valve 31 will move cavity 154 out of register with port 153 and thereby prevent the exhaust of brake cylinder pressure through the main atmospheric port 155. In this position of the valve 31 brake cylinder pressure will be slowly released past the release valve 136 and thence to atmosphere through the port 161 in the release governing valve. When the pressures on opposite sides of the piston 2 have equalized the spring 5 will move the supplemental slide valve back to normal release and charging position. Air will then flow from chamber 1 into chamber 29ᵃ and the valve 31 will be moved to normal open position. In the restricted release position of the supplemental slide valve the re-charging of the emergency reservoir and the auxiliary reservoir will be retarded, as hereinbefore pointed out. In the normal release position of the supplemental slide valve the reservoirs will be recharged as hereinbefore pointed out. The quick release chamber 180 will be vented to atmosphere whenever the supplemental valve 11 is moved to service position (see Fig. 2). With the supplemental valve in service position air from chamber 180 will flow back through the connected ports and passages to port 176 in the main slide valve. In the service position of the supplemental slide valve port 176 is connected by a port and passage 186 to the exhaust port 184 of the main slide valve. This port 184 is connected to the atmospheric port 185. This arrangement of ports and passages will permit air to flow from chamber 180 to atmosphere in the service position of the supplemental slide valve.

When the brake pipe pressure and the auxiliary reservoir pressure have been equalized either by repeated service reductions of brake pipe pressure or by a full service reduction thereof, there will be equal pressure in chambers 36 and 33 of the auxiliary reservoir equalizing valve, as hereinbefore pointed out under the heading "Service application." It is also hereinbefore pointed out that when the pressures in chambers 36 and 33 are equal, or substantially so, the auxiliary reservoir is cut off from the brake pipe and then further reductions in brake pipe pressure will not reduce the auxiliary reservoir pressure. Under this condition of the control valve it is desirable to first release the trapped auxiliary reservoir pressure back into the train pipe, when increasing brake pipe pressure for the purpose of securing a release of the brakes, and this is brought about by the auxiliary reservoir release valve 246, said valve being controlled by the auxiliary emergency valve 73. The auxiliary reservoir passage 61 is connected by a passage 247 to a small chamber 248 and said chamber is connected to a chamber 249. Interposed between said two chambers, and seating toward the chamber 248, is a check valve 250. Chamber 249 is in communication with a small chamber 251 above the release valve 246. A spring 252 holds the valve 246 on its seat. Chamber 251 is in communication with chamber 72 and the check valve 246 normally closes said communication. In the chamber 72 is pivoted a bell crank lever 253, one arm of which is adapted to engage the lower end of the valve 246. The other end of said bell crank lever is operatively connected to the stem 254 of a release plunger 255. This plunger reciprocates in a chamber 256 and the outer face thereof is exposed to the pressure in chamber 72 and its inner face is exposed to the pressure in chamber 256. A spring 257 normally holds the plunger in its outer position with its stem against a fixed stop and the lever 253 is in position to permit the valve 246 to seat. Chamber 256 is connected by a passage 258 to a port 259 in the seat of the valve 73. In the valve 73 is formed a cavity 260 which in the release position of the valve 73 connects port 259 to a port and passage 261. The pasage 261 leads into passage 177 and, with said passage, is in communication with the quick release chamber 180. This communication is by means of the cavity 178 in the release governing valve, when said valve is in quick release position, and port and passage 179 which leads to chamber 180. When the valve 73 is in released position chamber 256 is vented to the chamber 180, in the quick release position of the release governing valve, and the pressure in chamber 72 will force the plunger 255 inwardly thereby opening the auxiliary reservoir release valve 246. This will permit auxiliary reservoir air to flow into chamber 72 and thence through passages 71 and 25 to the brake pipe. By this means the auxiliary reservoir pressure will be equalized back into the brake pipe thus permitting the pressure in chamber 1 to move the piston 2 and the main and supplemental slide valve to release position.

In all quick release operations of the control valve the chamber 256 will be vented to the quick release chamber 180 and the valve 246 will be unseated. However, the pressures in the auxiliary reservoir and in the brake pipe will be substantially equal at all times except when the brake pipe pressure has been reduced below the point of equalization. It is clear, therefore, that the opening of the valve 246 will be a substantially idle operation except when the brake pipe has been reduced below the point of equalization, as hereinbefore pointed out.

*Release after service—Graduated release.*

The control valve is adjusted for graduated-release operations by moving inwardly the release-governing valve 26 to the position shown in Fig. 6. In this position of the release-governing valve the large exhaust port 152 in the seat of the release-governing valve is closed. The exhaust port 135 is also closed. Port 161 in the release-governing valve is moved out of register with port 160.

To effect a graduated release of the brakes the brake pipe pressure must be increased in the usual manner a predetermined amount, and the increased brake pipe pressure must be less than the full running pressure or full charging pressure. The increase in brake pipe pressure will flow to the chambers 1ª and 1 through the equalizing valve chamber, as hereinbefore pointed out in describing the charging operation, and the increasing pressure in chamber 1 will move the piston 2 and the supplemental slide valve to release position, as hereinbefore described. The increased pressure will flow through the charging port and passage to the auxiliary reservoir, and from said reservoir through passage 62 into the actuating chamber 63. The diaphragms will be moved downwardly and the valve 93 will be moved to release position (see Fig. 6). There will be no exhaust from chambers 36, 96 and 89 through port 135 because said port will be closed in the graduated-release position of the release-governing valve. In the release position of valve 93 a passage 187 is connected by cavity 188 in the valve 93 to a port 189. Port 189 is connected to a passage 190 which leads to a port 191 in the main slide valve seat. Port 191 is connected, through a restricted port, to port 184 of the main slide valve and this latter port is connected to a restricted port which leads to the atmospheric port 185. It is clear, therefore, that in the release position of the valve 93 air will flow from the equalizing chamber 89 through the restricted port to the atmospheric port 185. The control chamber 96 and the equalizing chamber 36 are connected to the equalizing chamber 89 through passage 88, and the ports and passages within communication therewith and with the said chambers, so that the pressures in said chambers 36 and 96 will be reduced with the pressure in chamber 89. The reduction of pressure in chamber 36 will have no effect upon the equalizing valve 41 because of the superior pressure in chamber 33. The reduction of pressure in chamber 96 will permit the superior pressure in the brake cylinder chamber 100 to depress the diaphragms 97 and 98 thereby carrying the release valve lever 104 downwardly, and through the pin 140 opening the release valve 136. When said valve is open brake cylinder pressure may flow through passage 141, chamber 137, passage 139 into the release chamber 99. From the release chamber air will flow through passage 142 into the retention chamber 90. From said passage 142 air will also flow through passage 156 past check valve 158 and thence through passage 192 into passage 190 and thence to the atmospheric port 185 as hereinbefore described. In the passage 192 is placed a restriction plug to limit the flow of brake cylinder pressure to atmosphere from passage 192. From the passage 156 brake cylinder pressure will also flow to the port 160 of the release governing valve and thence through cavity 178 of the release governing valve into port and passage 179 and through said passage into the quick release chamber 180. It is clear, therefore, that the volume of the chamber 180 is added to the volume of the retention chamber 90 in the graduated release operations.

When the pressure in chamber 89 has been reduced sufficiently to permit the undisturbed emergency reservoir pressure in chamber 64 to move the diaphragm structure and the valve 93 upwardly to lap position, the flow of air from chamber 89 and chambers 36 and 96 will be stopped. Brake cylinder pressure will continue to flow from chamber 100 until the pressure in chamber 96 is slightly superior to the pressure in chamber 100, whereupon the release valve 136 will be closed; thereby stopping the exhaust of brake cylinder pressure. The pressure in the actuating chamber 63 was increased a predetermined amount and the pressure in chamber 89 must be reduced at a predetermined ratio to the increase of pressure in chamber 63. As hereinbefore pointed out, this ratio is approximately two-and-one-half to one, so that an increase of five pounds in chamber 63 would require a reduction of pressure of approximately twelve-and-one-half pounds in chamber 89 before the undisturbed emergency reservoir pressure in chamber 64 will move the pressure-graduating valve 93 to lap position. The pressure in chamber 96 will be reduced to an equality with the pressure in chamber 89 and that will result in a corresponding reduction of pressure in the brake cylinder and in the brake cylinder chamber 100.

If it be desired to make a further reduction of brake cylinder pressure a further increase in brake pipe pressure will be made and the release operation will be repeated. If it be desired to increase the brake cylinder pressure the brake pipe pressure will be reduced and the application operation will be repeated in the same manner as hereinbefore described.

The flow of brake cylinder pressure to the quick release chamber 180 will cause a quick drop in brake cylinder pressure and also will prevent the building up of a high pressure in passage 192. Pressure will continue to build up in the retention chamber 90 so long as the release valve 136 is open, and the pressure in said chamber will exert an upward force on the diaphragm $b$ in opposition to the pressure in chamber 89. The amount of pressure which will flow into chamber 90 will depend upon the length of time the valve 136 is held open. The air that flows into chamber 90 will blow down to atmosphere around check valve 158, through passages 192 and 190 and the connected ports and passages to the atmospheric port 185. If the release valve 136 is held open a sufficient time to permit brake cylinder pressure to blow down to atmosphere, it is obvious that the pressure in chamber 90 will also blow down to atmosphere during the same interval. The pressure is not trapped in chamber 90 but remains therein only temporarily.

The purpose of permitting air to flow into the chamber 90 is to retard the release of control chamber pressure through chamber 89 and the passage 187. When the auxiliary reservoir pressure in chamber 63 has been increased for a release of the brakes, the diaphragm structure and the pressure-graduating valve 93 will be moved downwardly to release position. This will result in a release of control chamber pressure and consequently a reduction of pressure in control chamber 96. The release valve 136 will be opened and brake cylinder pressure will flow to chamber 90 as hereinbefore described. The pressure built up in chamber 90 will move the diaphragm structure and the valve 93 upwardly. This upward movement of the valve 93 will stop the flow of air from chamber 89 and chamber 96. When the brake cylinder pressure has been sufficiently reduced in chamber 100 the release valve 136 will be closed. This will stop the flow of air to chamber 90, and the air in said chamber 90 will blow down to atmosphere as hereinbefore pointed out. When the pressure in chamber 90 has been sufficiently reduced the pressure-graduating valve 93 will be again moved down to release position thereby releasing more pressure from chamber 89 and from the control chamber 96. This pulsating operation of the pressure-graduating valve will continue until the pressure in the control chamber and chamber 89 has been sufficiently reduced to permit the emergency reservoir pressure in chamber 64 to counter-balance the force exerted by the pressure in chamber 63 and the pressure retained in chamber 89. This operation of the pressure-graduating valve will retard the release of brake cylinder pressure.

In passage 190 is arranged a check valve 193 adapted to seat toward the port in the seat of the pressure-graduating valve 93. This valve is held from its seat by a light spring. Air may flow from the valve 93 through passage 190, but the check valve will prevent a back-flow of air. Any considerable pressure on the valve 193 tending to seat it will overcome the spring and prevent the flow of air past the check valve.

The port 160 in the seat of the release-governing valve is connected to an exhaust port 194, and said exhaust port is normally closed by a plug 195. When it is desired to operate the control valve in graduated release and without the pressure build-up during cycling operations, the plug 195 is removed. This provides a free exhaust of brake cylinder pressure through passage 156 and the connected ports and passages to port 160 in the seat of the release-governing valve and thence to atmosphere through port 194. Therefore there will be no build-up of pressure in the retention chamber 90 and the control valve will operate in graduated release without the pressure build-up during cycling operations.

With the release-governing valve 26 in graduated-release postion port 177 in the seat of the release-governing valve will be closed and brake pipe pressure will be maintained on opposite sides of the quick-release plunger 169 so that said plunger will not be moved in release operations.

When the release-governing valve is in graduated-release position the quick-re'ease chamber 180 is connected to the brake cylinder release passage 156 through passage 179, cavity 178 of the release-governing valve, passage 160, cavity 159 in the main slide valve and port 157 in the main slide valve seat. Passage 156 is connected to the retention chamber 90 by the passage 142. Passage 156 is also connected to the brake cylinder release passage 190 through the restriction plug in passage 192. If the quick release chamber 180 should be charged with high pressure air when the release-governing valve is placed in graduated release position the air from said chamber will flow through the passage 179 and the connected ports and passages as herein described, to the passage 156 and seat valve 158. From passage 156 said high pressure air will blow down through the restriction plug in passage 192 and then through passage 190 to the atmospheric port 185. The check valve 158 will prevent the high pressure air from chamber 180 passing into the retention chamber. The check valve 193 will prevent high pressure air passing through passage 190 to the seat of the valve 93.

*Emergency application.*

An emergency application of the brakes is effected by an emergency reduction of brake pipe pressure in the usual manner. An emergency reduction of brake pipe pressure in chamber 24 will result in a corresponding reduction of pressure in supplemental brake pipe chamber $1^a$, because of the open communication between chambers 24 and $1^a$. There will also be a reduction of pressure in chamber 1 through the passage 22 and the restriction plug 23, but this reduction in chamber 1 will not be as great as the reduction in chamber $1^a$. The piston 2 and the supplemental slide valve will be moved inwardly or toward the right to the limit of their travel. The emergency piston 12 will be moved toward the right by the pressure in chamber 1, the service lap stop spring 16 being compressed. The piston 12 carries a gasket on its outer face which seals on the annular rib 20. This prevents any leakage from chamber 1 around the piston 12. The movement of the piston 12 will carry the main slide valve to emergency position, as shown in Fig. 4. The pressure in the auxiliary reservoir chamber 6 will hold the supplemental slide valve in its inner position and the pressure in chamber 1 will hold the main slide valve in emergency position. The ports and passages in the supplemental slide valve have no function in the emergency application; therefore, the movement of this valve to its inner position in emergency applications is an idle movement.

The movement of the main slide valve to emergency position places cavity 196 of the main slide valve in position to connect port 70 to port and passage 197. The passage 197 is connected to passage 88. Cavity 196 is connected to the main valve chamber 1 by port 198. It is clear therefore that auxiliary reservoir will equalize into the main valve chamber through port 198 and will equalize into the chambers 89 and 96. Port 87 in the main slide valve seat, which is connected to the passage 88, will be closed when the main slide valve is in emergency position so that air cannot flow from passage 88 to the chamber 86 as hereinbefore described in connection with the service application operation.

The auxiliary reservoir chamber 6 is connected by passage 61 and a short branch passage 199 to a chamber 200 below a valve seat 201. Below this valve seat is arranged a valve 202, and below said valve and engaging its under side is a spring 203. Above the chamber 200 is formed a chamber 204 which normally is in open communication with chamber 200 past the valve 202. In all operations of the control valve, except emergency operations, the valve 202 is held from its seat by auxiliary reservoir pressure in chamber 200. Connected to chamber 204 is a passage 205 which leads to a port 206 in the main slide valve seat. This port is closed by the main slide valve except in the emergency position of said valve. When the main slide valve is in emergency position a cavity 207 therein connects port 206 with a port 208, and said port leads into a passage 209. Passage 209 leads into a chamber 210.

In this chamber is mounted a piston 211 which is normally held in its inner and inactive position by spring 212. Piston 211 is provided with an outwardly extending stem 213 to which is operatively connected the upper end of one arm of a pivoted bell-crank lever 214. The other arm of said lever engages an emergency brake pipe vent valve 215. This valve is located in chamber 24 and controls a large exhaust port 216. Said valve is held seated in all operations of the control valve, except emergency operations, by a spring 217. When auxiliary reservoir air is admitted into the chamber 210 the piston 211 will be moved outwardly and the emergency brake pipe vent valve will be opened, thereby permitting brake pipe pressure to flow to atmosphere through the large exhaust port 216.

Chamber 218 below the valve 202 is connected by a passage 219 to port 191 in the main slide valve seat. In the emergency position of the main slide valve the large port and cavity 154 connects the port 191 to a small port 220 in the seat of the main slide valve. Port 220 is connected by a passage 221 to the main brake cylinder port 144 so that emergency brake cylinder pressure will flow through passage 221, port 220, cavity and port 184 into port 191, and thence through passage 219 to chamber 218 below the valve 202, and will force said valve upwardly to its seat thereby closing communication between passages 199 and 205. This stops the flow of auxiliary reservoir air to the chamber 210. The plunger 211 is formed with a small leak port 222 so that the air in the chamber 210 may leak down to atmosphere and permit the spring 212 to move the plunger inwardly. This will permit the brake pipe vent valve 215 to close.

The movement of the main slide valve to emergency position will close port and passage 173 and thereby seal chamber 170 and retain pressure therein. This will prevent any movement of the quick release piston 169 so that there will be no danger of the quick release valve opening. The pressure trapped in chamber 170 may leak down and equalize with the pressure in chamber 165 through the small leak port 181. Upon an emergency reduction of brake pipe pressure there probably will be a reduction of pressure in chamber 165 through the passage 171 which connects said chamber to the brake pipe passage 25.

As hereinbefore pointed out emergency reservoir air may flow from the emergency reservoir E through passage 67 into the chamber 66. Chamber 66 is connected by a passage 223 to a chamber 224. An emergency valve 225 normally closes communication between chamber 66 and chamber 224 and this valve is normally held seated by the pressure in chamber 66 and by a spring 226. In the chamber 224 is pivoted a bell crank lever 227, one arm of which is adapted to engage and lift the emergency valve from its seat. The other arm of said lever is operatively connected to a stem 228 of an emergency plunger 229 which reciprocates in a chamber 230. The outer face of the plunger 229 is subject to the pressure in chamber 224, while the inner side thereof is subject to the pressure in chamber 230. Normally these pressures are equalized and the plunger is held in its outer or inactive position by a spring 231. The chamber 230 is connected by a passage 232 to a port 233 in the seat of the main slide valve. Chamber 224 is connected by a passage 234 directly with the main slide valve chamber 1. In all positions of the supplemental slide valve the port 233 is connected, by a port 233ª in the main slide valve and port 235 in the supplemental slide valve, to the main slide valve chamber 1, port 235 having a long foot 236 for this purpose. It is clear, therefore, that in all operations of the valve, except emergency operation, the pressures in chambers 224 and 230 will be equalized with the pressure in the main valve chamber 1. In the emergency position of the main slide valve port 233 is connected by a cavity 237 in the main slide valve to an atmospheric port 238 so that the chamber 230 will be vented to atmosphere. The plunger 229 will be moved inwardly by pressure in chamber 224 and the emergency valve 225 will be opened to permit emergency reservoir air to flow from chamber 66 into chamber 224 and thence through passage 234 into the main slide valve chamber. The main slide valve is formed with an elbow port 144ª which, in the emergency position of said valve, connects the main slide valve chamber with the main brake cylinder port 144. The port 144ª opens into the main slide valve chamber through the side of the main slide valve so that air may flow from the said main valve chamber to the brake cylinder chamber 100 and thence to the brake pipe.

The emergency reduction of brake pipe pressure results in a corresponding reduction of pressure in chamber 72 of the auxiliary emergency valve. The pressure in chamber 76 will force the piston 75 toward the right, causing the service stop 75ª to compress the service stop spring. The valve 73 will be moved to its extreme emergency position, as shown in Fig. 4, and will uncover port 262. This port is connected by passage 263 to a chamber 264 below a piston 239 which is mounted to reciprocate in a chamber 240. The piston 239 is formed with an upwardly extending tubular stem which is adapted to receive a depending stem carried by the supplemental emergency vent valve 81. Brake pipe air from chamber 76 will flow into the chamber 264 and cause piston 239 to move valve 81 to its open position. Chamber 80 is connected by passage 241 to a chamber 242 below the valve 81, and this latter chamber is connected by passage 243 to a large atmospheric port 244. When the valve 81 is raised from its seat air may flow from the supplemental brake pipe chamber 1ª direct to atmosphere. This ensures a quick movement of the main slide valve to emergency position. When the main slide valve is in emergency position no air can flow through passage 77 to the chamber 76 because the feed port and passage 53 is closed. In the emergency position of the auxiliary emergency valve 73 chamber 79 is sealed and the air trapped therein cannot flow to the brake pipe. The plunger 239 is formed with a leak port 239ª to permit the air in chamber 264 to leak down to atmosphere. When the pressure in chamber 264 has been sufficiently reduced the spring 82 will seat the valve 81.

When the chamber 33 is vented to atmosphere through passage 25 the spring 126 will move the equalizing valve 41 to lap position. There will be no pressure in chamber 36 because the port 110 is closed when the main slide valve moves to emergency position. There will be an equalization of pressures in chambers 1, and 26 through the passage 118.

The pressure admitted to chamber 96 will lift the diaphragms 98 and 97 and open the application valve 106 and connect the brake pipe to the brake cylinder chamber 100 through the compensating valve 105. Air will flow from the service reservoir and the brake pipe into the brake cylinder chamber 100. This flow will be only at the beginning of the emergency application. When the emergency reservoir air is dumped into the brake cylinder the high emergency brake cylinder pressure in chamber 100 will force the diaphragms downwardly, permitting the application valve to close and move the compensating valve to lap position. Thereafter the service reservoir will remain sealed unless the brake cylinder pressure should leak down below the pressure trapped in chamber 96. Should this occur the application valve will be opened to permit air to flow from the service reservoir to the brake cylinder until the service reservoir is equalized into the brake cylinder.

*Release after emergency application.*

A release after an emergency application is effected in the usual manner by increasing the brake pipe pressure. An increase in brake pipe pressure in chamber 24 will result in a corresponding increase of pressure in chamber 33 of the equalizing valve, and as there is no pressure in chamber 36 the diaphragms and the equalizing valve 41 will be moved downwardly. This will uncover port 42 and permit brake pipe air to flow from chamber 33 through port 42 and passage 43 into passage 44 and thence into the supplemental brake pipe chamber 1ª. When the pressure in chamber 1ª, plus the energy exerted by the spring 16, is sufficient to overcome the opposing pressure in chamber 1, the main slide valve will be moved back to its normal position, thereby uncovering port and passage 22. The increasing brake pipe pressure will now flow into chamber 1 and will force the piston 2 and the supplemental slide valve to release and charging position, whereupon the recharging of the reservoir will take place as hereinbefore described, and the brake cylinder pressure will be released to atmosphere. When the main and supplemental slide valves are in release position the passage 219 will be connected to atmospheric port 185 through passage 190, which passage leads into port 191. At this time port 191 is connected to port 184 in the main slide valve which port is in communication with the atmospheric port 185. This permits the chamber 218 to blow down to atmosphere, and valve 202 will be unseated. This restores the control valve to normal running condition. Chamber 210 will blow down to atmosphere through passage 209, port 208, extension 184ª of port 184 of the main slide valve, and then through atmospheric port 185.

What I claim is:

1. A fluid pressure brake control valve comprising a main slide valve chamber, a slide valve therein, an actuating piston connected to said slide valve, means for applying brake pipe pressure to one side of said piston, means for applying auxiliary reservoir pressure to the other side of said piston, an auxiliary reservoir pressure-equalizing valve device formed with an equalizing-control chamber and a brake pipe chamber, means placing the brake pipe chamber in communication with the brake pipe, means for establishing in the equalizing control chamber a pressure equal to the brake cylinder pressure, and means operating upon an equalization of pressures in said two chambers to place the control chamber in communication with the main slide valve chamber and to cut off the main slide valve chamber from the brake pipe.

2. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, means for applying auxiliary reservoir pressure to the outer side of the said main piston, an auxiliary reservoir pressure-equalizing valve device formed with an equalizing control chamber and a brake pipe chamber, means placing the brake pipe chamber in communication with the brake pipe, the supplemental slide valve in service position connecting the auxiliary reservoir with the equalizing control chamber, and means operating upon an equalization of pressures in the control chamber and the brake pipe chamber to place the control chamber in communication with the main slide valve chamber and to cut off the main slide valve chamber from the brake pipe.

3. A fluid pressure brake control valve comprising a main slide valve chamber, a main slide valve therein, a supplemental slide valve superposed on the main slide valve, a main actuating piston connected to the supplemental slide valve, means for applying auxiliary reservoir pressure to the outer side of the said main piston, an auxiliary reservoir pressure-equalizing valve device formed with an equalizing control chamber and a brake pipe chamber, means placing the brake pipe chamber in communication with the brake pipe, means placing the said brake pipe chamber in communication with the main slide valve chamber, the supplemental slide valve in service position connecting the auxiliary reservoir with the equalizing control chamber, and means operating upon an equalization of pressures in the control chamber and the brake pipe chamber to place the control chamber in communication with the main slide valve chamber and to cut off the main slide valve chamber from the brake pipe.

4. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, means for applying auxiliary reservoir pressure to the outer side of the said main piston, an application valve, a control chamber, a brake cylinder chamber, means operated by the opposed pressures in the control chamber and the brake cylinder chamber to open and close said application valve, means whereby service reservoir air will flow direct to the application valve, a brake cylinder release valve, means whereby the opposed pressures in the control chamber and the brake cylinder chamber will operate said release valve, a brake cylinder compensating valve, means whereby the pressure in the control chamber will move said compensating valve to connect the brake pipe to the said brake cylinder chamber, means whereby the main and supplemental slide valves in the service position of the supplemental valve will admit auxiliary reservoir air into the said control chamber, and means whereby the main slide valve and the supplemental slide valve in the release position of said supplemental slide valve will connect the control chamber to atmosphere, and will connect the brake cylinder chamber to atmosphere.

5. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, means for applying auxiliary reservoir pressure to the outer side of the said main piston, an application valve, a control chamber, a brake cylinder chamber, means operated by the opposed pressures in the control chamber and the brake cylinder chamber to open and close said application valve, means whereby service reservoir air will flow direct to the application valve, a brake cylinder release valve, means whereby the opposed pressures in the control chamber and the brake cylinder chamber will operate said release valve, a brake cylinder compensating valve, means whereby the pressure in the control chamber will move said compensating valve to application position to connect the brake pipe to the said brake cylinder chamber, means whereby the main and supplemental slide valves in the service position of the supplemental valve will admit auxiliary reservoir air into the said control chamber, means whereby the main slide valve and the supplemental slide valve in the release position of said supplemental slide valve will connect the control chamber to atmosphere and will connect the brake cylinder chamber to atmosphere, and means whereby when the compensating valve is in application position the brake pipe will be connected to a service reservoir to permit air to flow from the brake pipe to said reservoir.

6. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, means for applying auxiliary reservoir pressure to the outer side of the said main piston, an application valve, a control chamber, a brake cylinder chamber, means operated by the opposed pressures in the control chamber and the brake cylinder chamber to open and close said application valve, means whereby service reservoir air will flow direct to the application valve, a brake cylinder compensating valve, means whereby the pressure in the control chamber will move said compensating valve to application position to connect the brake pipe to the said brake cylinder chamber, means whereby the main and supplemental slide valves in the service position of the supplemental valve will admit auxiliary reservoir air into the said control chamber, means whereby the main slide valve and the supplemental slide valve in the release position of said supplemental slide valve will connect the control chamber to atmosphere, and means whereby when the compensating valve is in application position the brake pipe will be connected to a service reservoir to permit air to flow from the brake pipe to said reservoir.

7. A fluid pressure brake control valve comprising a slide valve chamber, a slide valve therein, an actuating piston connected to the said slide valve, means to admit brake pipe air to one side of said piston, means for applying auxiliary reservoir pressure to the other side of the said piston, an application valve, a control chamber, a brake cylinder chamber, means operated by the opposed pressures in the control chamber and the brake cylinder chamber to open and close said application valve, means whereby service reservoir air will flow to the application valve, a brake cylinder compensating valve, means whereby the pressure in the control chamber will move said compensating valve to application position to connect the brake pipe to the said brake cylinder chamber, means whereby the slide valve in the service position of the said valve will admit auxiliary reservoir air into the said control chamber, means to connect the control chamber to atmosphere in the release operation of the control valve, and means whereby when the compensating valve is in application position the brake pipe will be connected to a service reservoir to permit air to flow from the brake pipe to said reservoir.

8. A fluid pressure brake control valve comprising a slide valve chamber, a slide valve therein, an actuating piston connected to the said slide valve, means to admit brake pipe air to one side of said piston, means for applying auxiliary reservoir pressure to the other side of the said piston, an application valve, a control chamber, a brake cylinder chamber, means operated by the opposed pressures in the control chamber and the brake cylinder chamber to open and close said application valve, means whereby service reservoir air will flow to the application valve, a brake cylinder compensating valve, means whereby the pressure in the control chamber will move said compensating valve to application position to connect the brake pipe to the said brake cylinder chamber, means whereby the slide valve in the service position of the said valve will admit auxiliary reservoir air into the said control chamber, means to connect the control chamber to atmosphere in the release operation of the control valve, means whereby when the compensating valve is in application position the brake pipe will be connected to a service reservoir to permit air to flow from the brake pipe to said reservoir, and a brake cylinder pressure graduating valve subject to auxiliary reservoir, control chamber and emergency reservoir pressures and operating upon an increase of brake pipe pressure to decrease the pressure in the control chamber in direct ratio to the increase in auxiliary reservoir pressure.

9. A fluid pressure brake control valve comprising a slide valve chamber, a slide valve therein, an actuating piston connected to the said slide valve, means to admit brake pipe air to one side of said piston, means for applying auxiliary reservoir pressure to the other side of the said piston, an application valve, a control chamber, a brake cylinder chamber, means operated by the opposed pressures in the control chamber and the brake cylinder chamber to open and close said application valve, means whereby service reservoir air will flow to the application valve, a brake cylinder compensating valve, means whereby the pressure in the control chamber will move said compensating valve to application position to connect the brake pipe to the said brake cylinder chamber, means whereby the slide valve in the service position of the said valve will admit auxiliary reservoir air into the said control chamber, means to connect the control chamber to atmosphere in the release operation of the control valve, means whereby when the compensating valve is in application position the brake pipe will be connected to a service reservoir to permit air to flow from the brake pipe to said reservoir, and a brake cylinder pressure graduating valve operating upon an increase of brake pipe pressure to decrease the pressure in the control chamber in direct ratio to the increase in auxiliary reservoir pressure.

10. A fluid pressure brake control valve comprising a slide valve chamber, a slide valve therein, an actuating piston connected to the said slide valve, means to admit brake pipe air to one side of said piston, means for applying auxiliary reservoir pressure to the other side of the said piston, an application valve, a control chamber, a brake cylinder chamber, means operated by the opposed pressures in the control chamber and the brake cylinder chamber to open and close said application valve, means whereby service reservoir air will flow to the application valve, a brake cylinder compensating valve, means whereby the pressure in the control chamber will move said compensating valve to application position to connect the brake pipe to the said brake cylinder chamber, means whereby the slide valve in the service position of the said valve will admit auxiliary reservoir air into the said control chamber, means to connect the control chamber to atmosphere in the release operation of the control valve, and a brake cylinder pressure graduating valve subject to auxiliary reservoir, control chamber and emergency reservoir pressures and operating upon an increase of brake pipe pressure to decrease the pressure in the control chamber in direct ratio to the increase in auxiliary reservoir pressure.

11. A fluid pressure brake control valve comprising a slide valve chamber, a slide valve therein, an actuating piston connected to the said slide valve, means to admit brake pipe air to one side of said piston, means for applying auxiliary reservoir pressure to the other side of the said piston, an application valve, a control chamber, a brake cylinder chamber, means operated by the opposed pressures in the control chamber and the brake cylinder chamber to open and close said application valve, means whereby service reservoir air will flow to the application valve, a brake cylinder compensating valve, means whereby the pressure in the control chamber will move said compensating valve to application position to connect the brake pipe to the said brake cylinder chamber, means whereby the slide valve in the service position of the said valve will admit auxiliary reservoir air into the said control chamber, means to connect the control chamber to atmosphere in the release operation of the control valve, and a brake cylinder pressure graduating valve operating upon an increase of brake pipe pressure to decrease the pressure in the control chamber in direct ratio to the increase in auxiliary reservoir pressure.

12. A fluid pressure brake control valve comprising a main slide valve chamber, a slide valve therein, a main actuating piston connected to the said slide valve, a brake pipe connection with the main slide valve chamber, means for applying auxiliary reservoir pressure to the outer side of the said main piston, an application valve, a control chamber, a brake cylinder chamber, means operated by the opposed pressures in the control chamber and the brake cylinder chamber to open and close said application valve, means whereby service reservoir air will flow to the application valve, means whereby the slide valve in the service position of the said valve will admit auxiliary reservoir air into the said control chamber, means to connect the control chamber to atmosphere in the release operation of the control valve, and a brake cylinder pressure graduating valve subject to auxiliary reservoir, control chamber and emergency reservoir pressures and operating upon an increase of brake pipe pressure to decrease the pressure in the control chamber in direct ratio to the increase in auxiliary reservoir pressure.

13. A fluid pressure brake control valve comprising a main slide valve chamber, a slide valve therein, a main actuating piston connected to the said slide valve, a brake pipe connection with the main slide valve chamber, means for applying auxiliary reservoir pressure to the outer side of the said main piston, an application valve, a control chamber, a brake cylinder chamber, means operated by the opposed pressures in the control chamber and the brake cylinder chamber to open and close said application valve, means whereby service reservoir air will flow to the application valve, means whereby the slide valve in the service position of the said valve will admit auxiliary reservoir air into the said control chamber, means to connect the control chamber to atmosphere in the release operation of the control valve, and a brake cylinder pressure graduating valve operating upon an increase of brake pipe pressure to decrease the pressure in the control chamber in direct ratio to the increase in auxiliary reservoir pressure.

14. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, means for applying auxiliary reservoir pressure to the outer side of said main piston, an emergency piston, means operatively connecting said emergency piston to the main slide valve, a brake pipe connection with the supplemental brake pipe chamber, the emergency piston moving the main slide valve to emergency position upon an emergency reduction of brake pipe pressure, an application valve, a control chamber, a brake cylinder chamber, means operated by the opposed pressures in the control chamber and the brake cylinder chamber to open and close said application valve, means whereby service reservoir air will flow direct to the application valve, a brake cylinder release valve, means whereby the opposed pressures in the control chamber and the brake cylinder chamber will operate said release valve, a brake cylinder compensating valve, means whereby the pressure in the control chamber will move said compensating valve to connect the brake pipe to the said brake cylinder chamber, means whereby the main and supplemental slide valves in the service position of the supplemental valve will admit auxiliary reservoir air into the said control chamber, and means whereby the main slide valve and the supplemental slide valve in the release position of said supplemental slide valve will connect the control chamber to atmosphere, and will connect the brake cylinder chamber to atmosphere.

15. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, means for applying auxiliary reservoir pressure to the outer side of said main piston, an emergency piston, means operatively connecting said emergency piston to the main slide valve, a brake pipe connection with the supplemental brake pipe chamber, the emergency piston moving the main slide valve to emergency position upon an emergency reduction of brake pipe pressure, an application valve, a control chamber, a brake cylinder chamber, means operated by the opposed pressures in the control chamber and the brake cylinder chamber to open and close said application valve, means whereby service reservoir air will flow direct to the application valve, a brake cylinder release valve, means whereby the opposed pressure in the control chamber and the brake cylinder chamber will operate said release valve, a brake cylinder compensating valve, means whereby the pressure in the control chamber will move said compensating valve to connect the brake pipe to the said brake cylinder chamber, means whereby the main and supplemental slide valves in the service position of the supplemental valve will admit auxiliary reservoir air into the said control chamber, means whereby the main slide valve and the supplemental slide valve in the release position of said supplemental slide valve will connect the control chamber to atmosphere, and will connect the brake cylinder chamber to atmosphere, and means whereby when the compensating valve is in application position the brake pipe will be connected to a service reservoir to permit air to flow from the brake pipe to said reservoir.

16. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, means for applying auxiliary reservoir pressure to the outer side of said main piston, an emergency piston, means operatively connecting said emergency piston to the main slide valve, a brake pipe connection with the supplemental brake pipe chamber, the emergency piston moving the main slide valve to emergency position upon an emergency reduction of brake pipe pressure, an application valve, a control chamber, a brake cylinder chamber, means operated by the opposed pressures in the control chamber and the brake cylinder chamber to open and close said application valve, means whereby service reservoir air will flow direct to the application valve, a brake cylinder compensating valve, means whereby the pressure in the control chamber will move said compensating valve to connect the brake pipe to the said brake cylinder chamber, means whereby the main and supplemental slide valves in the service position of the supplemental valve will admit auxiliary reservoir air into the said control chamber, and means whereby the main slide valve and the supplemental slide valve in the release position of said supplemental slide valve will connect the control chamber to atmosphere, and will connect the brake cylinder chamber to atmosphere.

17. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, means for applying auxiliary reservoir pressure to the outer side of said main piston, an emergency piston, means operatively connecting said emergency piston to the main slide valve, a brake pipe connection with the supplemental brake pipe chamber, the emergency piston moving the main slide valve to emergency position upon an emergency reduction of brake pipe pressure, an application valve, a control chamber, a brake cylinder chamber, means operated by the opposed pressures in the control chamber and the brake cylinder chamber to open and close said application valve, means whereby service reservoir air will flow direct to the application valve, a brake cylinder compensating valve, means whereby the pressure in the control chamber will move said compensating valve to connect the brake pipe to the said brake cylinder chamber, means whereby the main and supplemental slide valves in the service position of the supplemental valve will admit auxiliary reservoir air into the control chamber, and means whereby the main slide valve and the supplemental slide valve in the release position of said supplemental slide valve will connect the control chamber to atmosphere.

18. A fluid pressure brake control valve comprising a main slide valve chamber, a main slide valve therein, a supplemental slide valve superposed on the main slide valve, a main actuating piston connected to the supplemental slide valve, means for applying auxiliary reservoir pressure to the other side of the said main piston, an auxiliary reservoir pressure-equalizing valve device formed with an equalizing control chamber and a brake pipe chamber, means placing the brake pipe chamber in communication with the main slide valve chamber, the supplemental slide valve in service position connecting the auxiliary reservoir with the equalizing control chamber, means operating upon an equalization of pressures in the control chamber and the brake pipe chamber to place the control chamber in communication with the main slide valve chamber and to cut off the main slide valve chamber from the brake pipe, and means operating upon an increase of brake pipe pressure after an application of the brakes to connect the auxiliary reservoir to the brake pipe.

19. A fluid pressure brake control valve comprising a main slide valve chamber, a slide valve therein, an actuating piston connected to said slide valve, means for applying brake pipe pressure to one side of said piston, means for applying auxiliary reservoir pressure to the other side of said piston, an auxiliary reservoir pressure-equalizing valve device formed with an equalizing-control chamber and a brake pipe chamber, means placing the brake pipe chamber in communication with the brake pipe, means for establishing in the equalizing control chamber a pressure equal to the brake cylinder pressure, means operating upon an equalization of pressures in said two chambers to place the control chamber in communication with the main slide valve chamber and to cut off the main slide valve chamber from the brake pipe, and means operating upon an increase of brake pipe pressure after an application of the brakes to connect the auxiliary reservoir to the brake pipe.

20. A fluid pressure brake control valve comprising a main slide valve chamber, a slide valve therein, an actuating piston connected to said slide valve, means for applying brake pipe pressure to one side of said piston, means for applying auxiliary reservoir pressure to the other side of said piston, an auxiliary reservoir pressure-equalizing valve device formed with an equalizing-control chamber and a brake pipe chamber, means placing the brake pipe chamber in communication with the brake pipe, means for establishing in the equalizing control chamber a pressure equal to the brake cylinder pressure, means operating upon an equalization of pressures in said two chambers to seal the auxiliary reservoir and thereby prevent further reductions of auxiliary reservoir pressure, and means operating upon an increase of brake pipe pressure after an application of the brakes to connect the auxiliary reservoir to the brake pipe.

21. A fluid pressure brake apparatus comprising a control valve, a service reservoir, an emergency reservoir, an auxiliary reservoir, means in the control valve operating upon a service reduction of brake pipe pressure to connect the service reservoir and the brake pipe to the brake cylinder, means operating upon an emergency reduction of brake pipe pressure to connect the emergency reservoir to the brake cylinder, an auxiliary reservoir pressure-equalizing valve device operating upon an equalization of brake pipe and auxiliary reservoir pressures to seal the auxiliary reservoir and thereby prevent further reduction of auxiliary reservoir pressure when the brake pipe is reduced below the point of equalization, and means operating upon an increase of brake pipe pressure after an application of the brakes to connect the auxiliary reservoir to the brake pipe.

22. A fluid pressure brake apparatus comprising a control valve, an auxiliary reservoir, an auxiliary reservoir pressure-equalizing valve device operating upon an equalization of brake pipe and auxiliary reservoir pressures to seal the auxiliary reservoir and thereby prevent further reductions of auxiliary reservoir pressure when the brake pipe is reduced below the point of equalization, and means operating upon an increase of brake pipe pressure after an application of the brakes to connect the auxiliary reservoir to the brake pipe.

23. A fluid pressure brake apparatus comprising a control valve, a service reservoir, an emergency reservoir, an auxiliary reservoir, means in the control valve operating upon a service reduction of brake pipe pressure to connect the service reservoir to the brake cylinder, means operating upon an emergency reduction of brake pipe pressure to connect the emergency reservoir to the brake cylinder, an auxiliary reservoir pressure-equalizing valve device operating upon an equalization of brake pipe and auxiliary reservoir pressures to seal the auxiliary reservoir and thereby prevent further reduction of auxiliary reservoir pressure when the brake pipe is reduced below the point of equalization, and means operating upon an increase of brake pipe pressure after an application of the brakes to connect the auxiliary reservoir to the brake pipe.

24. A fluid pressure brake control valve comprising a main slide valve chamber, a slide valve therein, an actuating piston connected to said slide valve, means for applying brake pipe pressure to one side of said piston, means for applying auxiliary reservoir pressure to the other side of said piston, an auxiliary emergency valve, an auxiliary reservoir pressure-equalizing valve device formed with an equalizing-control chamber and a brake pipe chamber, means placing the brake pipe chamber in communication with the brake pipe, means for establishing in the equalizing control chamber a pressure equal to the brake cylinder pressure, means operating upon an equalization of pressures in said two chambers to seal the auxiliary reservoir and thereby prevent further reduction of auxiliary reservoir pressure, and means adapted to be opeated by the auxiliary emergency valve upon an increase of brake pipe pressure after an application of the brakes to connect the auxiliary reservoir to the brake pipe.

25. A fluid pressure brake control valve comprising a main slide valve chamber, a main slide valve therein, a supplemental slide valve in the main slide valve chamber, a main actuating piston connected to the supplemental slide valve, an emergency piston connected to the main slide valve and forming a supplemental brake pipe chamber, means connecting the brake pipe to the supplemental brake pipe chamber, means connecting the supplemental brake pipe chamber to the main brake pipe chamber, means whereby the main slide valve in emergency position will close comunication between the main slide valve chamber and the supplemental brake pipe chamber, means operating upon an emergency reduction of brake pipe pressure to vent the supplemental brake pipe chamber to atmosphere, and means operating when the main slide valve is in emergency position to open the brake pipe to atmosphere.

26. A fluid pressure brake control valve comprising a main slide valve chamber, a main slide valve therein, a supplemental slide valve in the main slide valve chamber, a main actuating piston connected to the supplemental slide valve, an emergency piston connected to the main slide valve and forming a supplemental brake pipe chamber, means connecting the brake pipe to the supplemental brake pipe chamber, means connecting the supplemental brake pipe chamber to the main brake pipe chamber, means whereby the main slide valve in emergency position will close communication between the main slide valve chamber and the supplemental brake pipe chamber, means operating upon an emergency reduction of brake pipe pressure to vent the supplemental brake pipe chamber to atmosphere, means operating when the main slide valve is in emergency position to open the brake pipe to atmosphere, and means adapted to operate when the main slide valve is in emergency position to place an emergency reservoir in communication with the brake cylinder.

27. In an air brake apparatus a brake pipe, an emergency reservoir, a service reservoir, an auxiliary reservoir, a control valve formed with a main slide valve chamber, a main slide valve therein, a supplemental slide valve superposed on the main slide valve, a main actuating piston connected to the supplemental slide valve and subject on one side to auxiliary reservoir pressure and on its other side to brake pipe pressure, an emergency piston operatively connected to the main slide valve and forming a supplemental brake pipe chamber, means connecting the brake pipe to the supplemental brake pipe chamber and to the main slide valve chamber, an application valve mechanism formed with a brake cylinder pressure chamber and a control chamber, a compensating valve, a brake cylinder pressure-release valve, means adapted to be operated by the opposing pressures in the brake cylinder-pressure chamber and the control chamber for operating the application valve, the compensating valve and the brake cylinder pressure release valve, a brake cylinder pressure graduating valve subject to auxiliary reservoir pressure, emergency reservoir pressure and control chamber pressure, an auxiliary reservoir-pressure-equalizing valve, a supplemental emergency valve, a supplemental brake pipe chamber vent valve, a quick release valve, an emergency valve, a release valve adapted to operate upon an increase of brake pipe pressure to release the auxiliary reservoir air to the brake pipe, a maually operable quick release valve, a main release control valve, an emergency brake pipe vent valve mechanism, a valve controlling the operation of the emergency brake pipe vent valve mechanism, means adapted to operate when the supplemental slide valve is in service position to connect the auxiliary reservoir to the control chamber, means whereby the service reservoir and the brake pipe will be connected to the brake cylinder when the auxiliary reservoir is connected to the control chamber, means adapted to be operated when the main slide valve is in emergency position to open the emergency valve and connect the emergency reservoir to the main valve chamber and to the brake cylinder, means adapted to be operated when the main slide valve is in emergency position to open the emergency brake pipe vent valve, means adapted to be operated when the supplemental emergency valve is in emergency position to open the supplemental brake pipe chamber vent valve, means whereby the auxiliary reservoir pressure-equalizing valve will operate upon an equalization of brake pipe and auxiliary reservoir pressures to cut off communication between the brake pipe and the supplemental brake pipe chamber, means adapted to be operated when the supplemental emergency valve is in release position to connect the auxiliary reservoir to the brake pipe, means whereby the supplemental slide valve in retarded recharging and restricted release position will close the main exhaust valve, means whereby the supplemental slide valve in release position and the release governing valve in quick release position will operate the quick release valve and connect the emergency reservoir to the brake pipe for a predetermined time, and means whereby the release governing valve in graduated release position will close the main brake cylinder exhaust port and the main exhaust from the control chamber.

28. A fluid pressure brake control valve comprising a main slide valve chamber, a main slide valve therein, a supplemental slide valve superposed on the main slide valve, a main actuating piston connected to the supplemental slide valve, a brake pipe connection with the main valve chamber, means for applying auxiliary reservoir pressure to the outer side of said main piston, a fixed stop to arrest the supplemental slide valve in service position, an emergency piston smaller in diameter than the main piston and operating in a supplemental brake pipe chamber, means operatively connecting said emergency piston to the main slide valve, a brake pipe connection with the supplemental brake pipe chamber, a service lap spring normally holding the main slide valve and the emergency piston in release and application position said spring being adapted to be compressed when the supplemental slide valve is moved to service position and moving said supplemental slide valve back to service lap position, the emergency piston moving the main slide valve to emergency position upon an emergency reduction of brake pipe pressure, the main actuating piston moving the supplemental slide valve to service position upon a service reduction and also upon an emergency reduction of brake pipe pressure, the main slide valve remaining stationary during a service reduction of brake pipe pressure, and means whereby the main slide valve in emergency position will close the brake pipe connection to the main slide valve chamber.

29. A fluid pressure brake control valve comprising a main slide valve chamber, a main slide valve therein, a supplemental slide valve superposed on the main slide valve, a main actuating piston connected to the supplemental slide valve, a restricted brake pipe connection with the main slide valve chamber, means for applying auxiliary reservoir pressure to the outer side of said main piston, a fixed stop to arrest the supplemental slide valve in service position, an emergency piston operating in a supplemental brake pipe chamber and subject to the pressure in said chamber and in the main valve chamber, means operatively connecting said piston to the main slide valve with a lost-motion connection, an unrestricted brake pipe connection with the supplemental brake pipe chamber, a service lap spring normally holding the main slide valve and the emergency piston in release and application position said spring being adapted to be compressed when the supplemental slide valve is moved to service position and moving said supplemental slide valve back to service lap position, the emergency piston moving the main slide valve to emergency position upon an emergency reduction of brake pipe pressure, the main actuating piston moving the supplemental slide valve to service position upon a service reduction and also upon an emergency reduction of brake pipe pressure, the main slide valve remaining stationary during a service reduction of brake pipe pressure, and means whereby the main slide valve in emergency position will close the brake pipe connection to the main slide valve chamber.

30. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, means for applying auxiliary reservoir pressure to the outer side of said main piston, a yieldable normal charging stop to hold the supplemental slide valve in normal charging position, means for charging a service reservoir through the main and supplemental slide valves, means for charging an emergency reservoir and an auxiliary reservoir through the main and supplemental slide valves when the supplemental slide valve is in normal charging position, means whereby an excessive charging pressure in the main valve chamber will move the supplemental slide valve to retarded re-charging position to thereby stop the charging of the emergency reservoir and to open communication through a restricted charging port to the auxiliary reservoir direct, and means whereby comunication with the service reservoir will be maintained in the retarded re-charging position of the supplemental slide valve, the normal charging stop returning the supplemental slide valve to normal charging position upon an equalization of pressures on opposite sides of the main actuating piston.

31. In an air brake apparatus, an emergency reservoir, an auxiliary reservoir, a control valve comprising a slide valve chamber, a slide valve therein, a piston connected to said valve, means to permit brake pipe pressure to operate on one side of said piston, means to permit auxiliary reservoir pressure to operate on the other side of said piston, an emergency brake pipe vent valve, means adapted to be operated by auxiliary reservoir air when the slide valve is in emergency position to open said brake pipe vent valve, a normally open valve permitting auxiliary reservoir air to flow to the brake pipe vent valve-operating means when the slide valve is in emergency position, and means to close said normally open valve after the said vent valve is opened to thereby stop the flow of auxiliary reservoir air to the vent valve operating means.

32. In a fluid pressure brake the combination with a brake pipe, a service reservoir, an emergency reservoir and a brake cylinder chamber, of an application valve controlling communication between the service reservoir and the brake cylinder chamber, a control chamber, means adapted to be moved by the opposed pressures of the control chamber and the brake cylinder chamber for opening and closing said application valve, a brake cylinder release valve, means adapted to be moved by the opposed pressures of the control chamber and the brake cylinder chamber for opening and closing said release valve, means operated by a reduction of brake pipe pressure to establish in the said control chamber a pressure equal to the desired brake cylinder pressure said established pressure moving the application valve to open position, means subject to auxiliary reservoir and control chamber pressures opposed to the pressure of the emergency reservoir and operating upon an increase of brake pipe pressure to exhaust air from said control chamber at a predetermined ratio to the increase in auxiliary reservoir pressure, and means to retard the release of control chamber pressure during cycling operations.

33. In a fluid pressure brake the combination with a brake pipe, a service reservoir, an emergency reservoir and a brake cylinder chamber, of an application valve controlling communication between the service reservoir and the brake cylinder chamber, a control chamber, means adapted to be moved by the opposed pressures of the control chamber and the brake cylinder chamber for opening and closing said application valve, a brake cylinder release valve, means adapted to be moved by the opposed pressures of the control chamber and the brake cylinder chamber for opening and closing said release valve, means operated by a reduction of brake pipe pressure to establish in the said control chamber a pressure equal to the desired brake cylinder pressure said established pressure moving the application valve to open position, a brake cylinder pressure graduating pilot valve subject to auxiliary reservoir and control chamber pressures opposed to the pressure of the emergency reservoir and operating upon an increase of brake pipe pressure to exhaust air from said control chamber at a predetermined ratio to the increase in auxiliary reservoir pressure, and means whereby the brake cylinder pressure graduating valve will operate during cycling operations to retard the release of control chamber pressure.

34. In a fluid pressure brake the combination with a brake pipe, a service reservoir, an emergency reservoir, an auxiliary reservoir and a brake cylinder chamber, of an application valve controlling communication between the service reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, means operated by a reduction of brake pipe pressure to establish in the said control chamber a pressure equal to the desired brake cylinder pressure said established pressure moving the application valve to open position, a release governing valve having a graduated release position and a quick release position, a pilot valve operating means consisting of an actuating diaphragm, an equalizing diaphragm, an emergency diaphragm, an actuating chamber in communication with the auxiliary reservoir, a brake cylinder pressure equalizing chamber between the actuating diaphragm and the equalizing diaphragm and in communication with the said control chamber, a retention chamber between the equalizing diaphragm and the emergency diaphragm and an emergency reservoir chamber in communication with the emergency reservoir, a brake cylinder pressure graduating valve operatively connected to said diaphragms and in its release position exhausting air from the equalizing chamber and the control chamber whereby the pressure in the brake cylinder pressure chamber will move the brake cylinder exhaust valve to release position, means to permit the brake cylinder pressure to flow from the said exhaust valve to the retention chamber, and means to permit the pressure in the retention chamber to slowly blow down to atmosphere without regard to the position of the said brake cylinder pressure graduating valve.

35. In an air brake apparatus, a service reservoir, an emergency reservoir, an auxiliary reservoir, a control valve comprising a main slide valve chamber, a main slide valve therein, a supplemental slide valve superposed on the main slide valve, a main actuating piston connected to the supplemental slide valve, a brake pipe connection with the main slide valve chamber, means for applying the auxiliary reservoir pressure to the outer side of said main piston, an emergency piston operating in a supplemental brake pipe chamber, means operatively connecting said emergency piston to the main slide valve, and a brake pipe connection with the supplemental brake pipe chamber, the emergency piston moving the main slide valve to emergency position upon an emergency reduction of brake pipe pressure said valve in emergency position connecting the auxiliary reservoir and the emergency reservoir to the brake cylinder, the main actuating piston moving the supplemental slide valve to service position upon a service reduction of brake pipe pressure, the main slide valve remaining stationary during the service movement of the supplemental slide valve, the supplemental slide valve in service position connecting the auxiliary reservoir to means to admit service reservoir air to the brake cylinder for a service application of the brakes.

36. In an air brake apparatus, an emergency reservoir, an auxiliary reservoir, a control valve comprising a slide valve chamber, a slide valve therein, a piston connected to said valve, means to permit brake pipe pressure to operate on one side of said piston, means to permit auxiliary reservoir pressure to operate on the other side of said piston, an emergency valve interposed between the emergency reservoir and the brake cylinder, means adapted to be operated when the slide valve is in emergency position to open said emergency valve to permit emergency reservoir air to flow to the brake cylinder, an emergency brake pipe vent valve, and means adapted to be operated by auxiliary reservoir air when the slide valve is in emergency position to open said brake pipe vent valve.

37. In an air brake apparatus, an emergency reservoir, an auxiliary reservoir, a control valve comprising a slide valve chamber, a slide valve therein, a piston connected to said valve, means to permit brake pipe pressure to operate on one side of said piston, means to permit auxiliary reservoir pressure to operate on the other side of said piston, an emergency valve interposed between the emergency reservoir and the brake cylinder, means adapted to be operated when the slide valve is in emergency position to open said emergency valve to permit emergency reservoir air to flow to the brake cylinder, an emergency brake pipe vent valve, means adapted to be operated by auxiliary reservoir air when the slide valve is in emergency position to open said brake pipe vent valve, a normally open valve permitting auxiliary reservoir air to flow to the brake pipe vent valve-operating means when the main slide valve is in emergency position, and means to permit air to close said normally open valve when the emergency valve is open to thereby stop the flow of auxiliary reservoir air to said valve-opening means.

38. A fluid pressure brake control valve comprising a main slide valve chamber, a slide valve therein, a piston connected thereto, means whereby an increase in brake pipe pressure will move the piston and the slide valve to normal charging position, means yieldable under an excessive brake pipe pressure to permit the piston and slide valve to move to retarded re-charging position, an exhaust-rate-regulating valve, a piston connected to said exhaust valve, means whereby said exhaust valve piston normally will be subject on both sides to equalized air pressure, and means whereby the slide valve in retarded recharging position will exhaust air from one side of the exhaust valve piston to permit said valve to be moved to closed position.

39. In an air brake apparatus, a service reservoir; an emergency reservoir; an auxiliary reservoir; and a control valve comprising a main slide valve chamber, a slide valve therein, an actuating piston connected to said slide valve, means for applying brake pipe pressure to one side of said piston, means for applying auxiliary reservoir pressure to the other side of said piston, an auxiliary reservoir pressure-equalizing valve device formed with an equalizing control chamber and a brake pipe chamber, means placing the brake pipe chamber in communication with the brake pipe, means for establishing in the equalizing control chamber a pressure equal to the brake cylinder pressure, means operating upon an equalization of pressures in said two chambers to place the control chamber in communication with the main valve chamber, and an application valve controlling communication between the service reservoir and the brake cylinder and adapted to automatically open communication between the service reservoir and the brake cylinder to compensate for brake cylinder leakage when the said control chamber is in communication with the main valve chamber 40. In an air brake apparatus, a service reservoir; an emergency reservoir; an auxiliary reservoir; and a control valve comprising a main slide valve chamber, a slide valve therein, an actuating piston connected to said slide valve, means for applying brake pipe pressure to one side of said piston, means for applying auxiliary reservoir pressure to the other side of said piston, an auxiliary reservoir pressure-equalizing valve device formed with an equalizing-control chamber and a brake pipe chamber, means placing the brake pipe chamber in communication with the brake pipe, means for establishing in the equalizing control chamber a pressure equal to the brake cylinder pressure, means operating upon an equalization of pressures in said two chambers to place the control chamber in communication with the main valve chamber, an application valve controlling communication between the service reservoir and the brake cylinder, and means whereby said valve will operate automatically to maintain brake cylinder pressure when the brake pipe pressure is reduced below brake cylinder pressure and independently of brake pipe reductions.

41. In an air brake apparatus, a service reservoir; an emergency reservoir; an auxiliary reservoir; and a control valve comprising a main slide valve chamber, a slide valve therein, an actuating piston connected to said slide valve, means for applying brake pipe pressure to one side of said piston, means for applying auxiliary reservoir pressure to the other side of said piston, an auxiliary reservoir pressure-equalizing valve device formed with an equalizing-control chamber and a brake pipe chamber, means placing the brake pipe chamber in communication with the brake pipe, means for establishing in the equalizing control chamber a pressure equal to the brake cylinder pressure, means operating upon an equalization of pressures in said two chambers to place the control chamber in communication with the main valve chamber, and automatically operating means to maintain brake cylinder pressure when the brake pipe pressure is reduced below brake cylinder pressure and independently of brake pipe reductions.

42. In an air brake apparatus, a service reservoir; an emergency reservoir; an auxiliary reservoir; and a control valve comprising a main slide valve chamber, a slide valve therein, an actuating piston connected to said slide valve, means for applying brake pipe pressure to one side of said piston, means for applying auxiliary reservoir pressure to the other side of said piston, an auxiliary reservoir pressure-equalizing valve device formed with an equalizing-control chamber and a brake pipe chamber, means placing the brake pipe chamber in communication with the brake pipe, means for establishing in the equalizing control chamber a pressure equal to the brake cylinder pressure, means operating upon an equalization of pressures in said two chambers to place the control chamber in communication with the main valve chamber, and means operating automatically upon an equalization of pressures in the auxiliary reservoir and brake pipe to render the control valve unresponsive to further service reductions in brake pipe pressure, whereby the brake cylinder pressure will not be reduced with the brake pipe below said point of equalization.

43. In an air brake apparatus, a service reservoir; an emergency reservoir; an auxiliary reservoir; and a control valve comprising a main slide valve chamber, a slide valve therein, an actuating piston connected to said slide valve, means for applying brake pipe pressure to one side of said piston, means for applying auxiliary reservoir pressure to the other side of said piston, and means operating automatically upon an equalization of pressures in the auxiliary reservoir and brake pipe to render the control valve unresponsive to further service reductions in brake pipe pressure, whereby the brake cylinder pressure will not be reduced with the brake pipe below said point of equalization.

44. In an air brake apparatus, a service reservoir; an emergency reservoir; an auxiliary reservoir; and a control valve comprising a main slide valve chamber, a slide valve therein, an actuating piston connected to said slide valve, means for applying brake pipe pressure to one side of said piston, means for applying auxiliary reservoir pressure to the other side of said piston, means operating automatically upon an equalization of pressures in the auxiliary reservoir, brake cylinder and brake pipe to render the control valve unresponsive to further service reductions in brake pipe pressure, whereby the brake cylinder pressure will not be reduced with the brake pipe below said point of equalization, and an automatically operating means to maintain the brake cylinder pressure at said point of equalization.

45. In a fluid pressure brake the combination with a brake pipe, a supply reservoir, a brake cylinder chamber, and a source of pressure substantially constant during service braking operations, of an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by opposed pressures of the control chamber and the brake cylinder chamber for opening and closing said exhaust valve, means operated by a reduction of brake pipe pressure to establish in said control chamber a pressure equal to the desired brake cylinder pressure said established pressure moving the application valve to open position, and means subject to control chamber pressure and a pressure variable with the brake pipe pressure, said two pressures being opposed to the said substantially constant pressure and operating upon an increase in brake pipe pressure to exhaust air from said control chamber.

46. In a fluid pressure brake the combination with a brake pipe, a supply reservoir, a brake cylinder chamber, and a source of pressure substantially constant during service braking operations, of an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by opposed pressures of the control chamber and the brake cylinder chamber for opening and closing said exhaust valve, means operated by a reduction of brake pipe pressure to establish in said control chamber a pressure equal to the desired brake cylinder pressure said established pressure moving the application valve to open position, and means subject to control chamber pressure and a pressure variable with the brake pipe pressure, said two pressures being opposed to the said substantially constant pressure and operating upon an increase in brake pipe pressure to exhaust air from said control chamber at a predetermined ratio to the increase in brake pipe pressure.

In testimony whereof I hereunto affix my signature.

WILLIAM ASTLE.